United States Patent
Rajappa et al.

(10) Patent No.: US 10,712,796 B2
(45) Date of Patent: Jul. 14, 2020

(54) METHOD AND APPARATUS TO GENERATE AND USE POWER, THERMAL AND PERFORMANCE CHARACTERISTICS OF NODES TO IMPROVE ENERGY EFFICIENCY AND REDUCING WAIT TIME FOR JOBS IN THE QUEUE

(71) Applicant: Intel Corporation, Santa Clara, CA (US)

(72) Inventors: Muralidhar Rajappa, Chandler, AZ (US); Andy Hoffman, Olympia, WA (US); Devadatta Bodas, Federal Way, WA (US); Justin Song, Olympia, WA (US); James Alexander, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 453 days.

(21) Appl. No.: 14/582,783

(22) Filed: Dec. 24, 2014

(65) Prior Publication Data

US 2016/0054783 A1  Feb. 25, 2016

Related U.S. Application Data

(60) Provisional application No. 62/040,576, filed on Aug. 22, 2014.

(51) Int. Cl.
*G05D 3/12* (2006.01)
*G05D 5/00* (2006.01)
(Continued)

(52) U.S. Cl.
CPC ........... *G06F 1/3203* (2013.01); *G05B 15/02* (2013.01); *G06F 1/30* (2013.01); *G06F 1/324* (2013.01);
(Continued)

(58) Field of Classification Search
CPC ......... G05B 15/02; G06F 1/30; G06F 1/3203; G06F 1/3209; G06F 1/3228;
(Continued)

(56) References Cited

U.S. PATENT DOCUMENTS

| | | |
|---|---|---|
| 5,388,265 A | 2/1995 | Volk |
| 5,598,537 A | 1/1997 | Swanstrom et al. |

(Continued)

FOREIGN PATENT DOCUMENTS

| | | |
|---|---|---|
| WO | 2002019078 | 3/2002 |
| WO | 2004070619 | 8/2004 |

(Continued)

OTHER PUBLICATIONS

Alvarruiz, F., de Alfonso, C., Caballer, M. and Hernandez, V. 2012. An Energy Manager for High Performance Computer Clusters. ISPA '12 Proceedings of the 2012 IEEE 10th International Symposium on Parallel and Distributed Processing with Applications.

(Continued)

*Primary Examiner* — Zhipeng Wang
(74) *Attorney, Agent, or Firm* — Womble Bond Dickinson (US) LLP

(57) ABSTRACT

A non-transitory computer readable storage medium having stored thereon instructions, the instructions being executable by one or more processors to perform operations including: receiving, by a calibration module executed by the one or more processors, a calibration request including (i) a workload type, (ii) a list of compute nodes belonging to a distributed computer system, and (iii) one or more frequencies; responsive to identifying the workload type as a clustered workload type, instructing a plurality of compute nodes on the list of compute nodes to begin processing a workload of the workload type; and responsive to identifying the workload type as a clustered workload type, instruct- (Continued)

ing a compute node on the list of compute nodes to begin processing the workload of the workload type is shown.

20 Claims, 6 Drawing Sheets

(51) Int. Cl.
| | |
|---|---|
| G05D 9/00 | (2006.01) |
| G05D 11/00 | (2006.01) |
| G05D 17/00 | (2006.01) |
| G06F 1/3203 | (2019.01) |
| G06F 1/3234 | (2019.01) |
| G06F 1/329 | (2019.01) |
| G06F 9/50 | (2006.01) |
| H04L 12/26 | (2006.01) |
| G06F 1/324 | (2019.01) |
| H04L 12/24 | (2006.01) |
| G05B 15/02 | (2006.01) |
| G06F 1/30 | (2006.01) |
| G06F 1/3209 | (2019.01) |
| G06F 1/3296 | (2019.01) |
| G06Q 50/06 | (2012.01) |
| G06F 1/3228 | (2019.01) |
| G06F 9/48 | (2006.01) |
| H04L 12/911 | (2013.01) |

(52) U.S. Cl.
CPC ............ *G06F 1/329* (2013.01); *G06F 1/3209* (2013.01); *G06F 1/3228* (2013.01); *G06F 1/3234* (2013.01); *G06F 1/3296* (2013.01); *G06F 9/4881* (2013.01); *G06F 9/4893* (2013.01); *G06F 9/5094* (2013.01); *G06Q 50/06* (2013.01); *H04L 41/0833* (2013.01); *H04L 43/08* (2013.01); *H04L 47/783* (2013.01); *H04L 47/821* (2013.01); *Y02D 10/22* (2018.01); *Y04S 40/162* (2013.01); *Y04S 40/168* (2013.01)

(58) Field of Classification Search
CPC ...... G06F 1/3234; G06F 1/329; G06F 1/3296; G06F 9/4881; G06F 9/4893; G06F 9/5094; G06Q 50/06; H04L 41/0833; H04L 47/783; H04L 47/821
See application file for complete search history.

(56) References Cited

U.S. PATENT DOCUMENTS

| | | | |
|---|---|---|---|
| 5,752,050 A | | 5/1998 | Hernandez et al. |
| 5,784,628 A | | 7/1998 | Reneris |
| 5,842,027 A | | 11/1998 | Oprescu et al. |
| 5,905,900 A | | 5/1999 | Combs et al. |
| 6,125,450 A | | 9/2000 | Kardach |
| 6,745,335 B1 | | 6/2004 | Kusano |
| 6,760,852 B1 | | 7/2004 | Gulick |
| 6,971,033 B2 | | 11/2005 | Ma |
| 7,028,200 B2 | | 4/2006 | Ma |
| 7,111,179 B1 | | 9/2006 | Girson |
| 7,143,300 B2 | | 11/2006 | Potter et al. |
| 7,861,068 B2 | | 12/2010 | Gorbatov et al. |
| 8,001,403 B2 | | 8/2011 | Hamilton et al. |
| 8,060,762 B2 | | 11/2011 | Banginwar et al. |
| 8,224,993 B1 | | 7/2012 | Brandwine |
| 8,336,056 B1 | | 12/2012 | Gadir |
| 8,370,929 B1 * | | 2/2013 | Pennington ......... G06F 11/3672 713/152 |
| 9,335,751 B1 * | | 5/2016 | Farshchian ............ G05B 15/02 |
| 2002/0194251 A1 | | 12/2002 | Richter et al. |
| 2003/0041272 A1 | | 2/2003 | Nguyen |
| 2003/0074161 A1 * | | 4/2003 | Smocha ............... G06F 11/3409 702/186 |
| 2003/0126240 A1 * | | 7/2003 | Vosseler ............... G06F 11/0709 709/221 |
| 2003/0163745 A1 | | 8/2003 | Kardach |
| 2003/0221026 A1 | | 11/2003 | Newman |
| 2004/0022225 A1 | | 2/2004 | Liang et al. |
| 2004/0025063 A1 | | 2/2004 | Riley |
| 2005/0113103 A1 | | 5/2005 | Snowden et al. |
| 2005/0136961 A1 | | 6/2005 | Simsonsson et al. |
| 2005/0138438 A1 | | 6/2005 | Bodas |
| 2005/0154789 A1 | | 7/2005 | Fellenstein et al. |
| 2005/0273633 A1 | | 12/2005 | Wilcox et al. |
| 2007/0220293 A1 | | 9/2007 | Takase |
| 2007/0240160 A1 | | 10/2007 | Paterson-Jones |
| 2007/0245161 A1 | | 10/2007 | Shaw et al. |
| 2008/0104428 A1 | | 5/2008 | Naffziger et al. |
| 2008/0178019 A1 | | 7/2008 | McGrane et al. |
| 2008/0209243 A1 | | 8/2008 | Ghiasi et al. |
| 2008/0222434 A1 | | 9/2008 | Shimizu et al. |
| 2008/0301475 A1 | | 12/2008 | Felter et al. |
| 2009/0049313 A1 | | 2/2009 | Gooding et al. |
| 2009/0083746 A1 | | 3/2009 | Katsumata et al. |
| 2009/0113221 A1 | | 4/2009 | Holle et al. |
| 2009/0138219 A1 | | 5/2009 | Bletsch et al. |
| 2009/0254660 A1 | | 10/2009 | Hanson et al. |
| 2009/0265568 A1 | | 10/2009 | Jackson |
| 2009/0271046 A1 * | | 10/2009 | Lewis ...................... G06F 11/30 700/291 |
| 2010/0036782 A1 * | | 2/2010 | Zhao .................... G06K 9/6217 706/13 |
| 2010/0106985 A1 | | 4/2010 | Panguluri et al. |
| 2010/0205469 A1 | | 8/2010 | McCarthy et al. |
| 2010/0235840 A1 | | 9/2010 | Angaluri |
| 2010/0257531 A1 * | | 10/2010 | Barsness ............... G06F 9/4893 718/102 |
| 2010/0313203 A1 | | 12/2010 | Dawson et al. |
| 2011/0022857 A1 | | 1/2011 | Nussbaum et al. |
| 2011/0022868 A1 | | 1/2011 | Harchol-Balter et al. |
| 2011/0161696 A1 * | | 6/2011 | Fletcher ................ G06F 1/3203 713/320 |
| 2011/0167425 A1 | | 7/2011 | Lurie et al. |
| 2011/0178652 A1 | | 7/2011 | Carter et al. |
| 2011/0271283 A1 * | | 11/2011 | Bell, Jr. ................ G06F 9/5094 718/102 |
| 2012/0005683 A1 | | 1/2012 | Bower, III et al. |
| 2012/0054512 A1 | | 3/2012 | Archibald et al. |
| 2012/0060170 A1 | | 3/2012 | Vajda |
| 2012/0072745 A1 | | 3/2012 | Ahluwalia et al. |
| 2012/0084580 A1 | | 4/2012 | Harchol-Balter et al. |
| 2012/0165963 A1 | | 6/2012 | Kim et al. |
| 2012/0216205 A1 | | 8/2012 | Bell et al. |
| 2012/0324264 A1 | | 12/2012 | Hanson et al. |
| 2013/0103968 A1 | | 4/2013 | Conroy et al. |
| 2013/0124885 A1 | | 5/2013 | Davis et al. |
| 2013/0139172 A1 | | 5/2013 | An et al. |
| 2013/0185576 A1 | | 7/2013 | Brundridge et al. |
| 2013/0212410 A1 | | 8/2013 | Li et al. |
| 2013/0227557 A1 | | 8/2013 | Pechanec et al. |
| 2013/0339776 A1 | | 12/2013 | Jagadishprasad et al. |
| 2014/0006534 A1 * | | 1/2014 | Jain ....................... G06F 9/5094 709/208 |
| 2014/0059556 A1 | | 2/2014 | Barness et al. |
| 2014/0075222 A1 | | 3/2014 | Jackson |
| 2014/0075448 A1 | | 3/2014 | Bell, Jr. et al. |
| 2014/0086534 A1 | | 3/2014 | Lu et al. |
| 2014/0114107 A1 | | 4/2014 | Gami |
| 2014/0137121 A1 | | 5/2014 | Asakura et al. |
| 2014/0149768 A1 | | 5/2014 | Kansal et al. |
| 2014/0214107 A1 | | 7/2014 | Gandhi et al. |
| 2014/0245054 A1 | | 8/2014 | Hamdi et al. |
| 2014/0282425 A1 | | 9/2014 | Zhao et al. |
| 2014/0317635 A1 * | | 10/2014 | Konno .................... G06F 9/505 718/105 |
| 2015/0067693 A1 | | 3/2015 | Yamazaki |
| 2015/0169026 A1 | | 6/2015 | Bodas et al. |
| 2015/0177814 A1 | | 6/2015 | Bailey et al. |

(56) References Cited

U.S. PATENT DOCUMENTS

| | | | |
|---|---|---|---|
| 2015/0248312 A1 | 9/2015 | Brochard et al. | |
| 2015/0301914 A1* | 10/2015 | Phuong | G06F 1/26 713/322 |
| 2016/0011914 A1 | 1/2016 | Bohn et al. | |

FOREIGN PATENT DOCUMENTS

| | | |
|---|---|---|
| WO | 2006007146 | 1/2006 |
| WO | 2013172816 | 11/2013 |
| WO | 2014053610 | 4/2014 |

OTHER PUBLICATIONS

Bhattacharya, A. 2013. Constraints and Techniques For Software Power Management In Production Clusters. Technical Report No. UCB/EECS-2013-110, Electrical Engineering and Computer Sciences, University of California at Berkeley. http://www.eecs.berkeley.ed.

Brehm, M. 2013. Energy Aware Scheduling SuperMUC@ LRZ. Application Support Group. Leibniz Supercomputing Centre. http://www.autotune-project.eu/system/files/Matthias_Brehm_Energietag.pdf.

Cai, C., Wang, L., Khan, S. and Tao, J. 2011. Energy-aware High Performance Computing—A Taxonomy Study. Parallel and Distributed Systems (ICPADS), 2011 IEEE 17th International Conference on. (Tainan, Taiwan. Dec. 7, 2009).

Department of Energy. 2013. CORAL procurement benchmarks. LLNL-PRE-637694. (May 31, 2013). https://asc.llnl.gov/CORAL-benchmarks/CORALBenchmarksProcedure-v26.pdf.

Etinski, M., Corbalan, J. and Labarta, J. Power-Aware Parallel Job Scheduling. Barcelona Supercomputing Center. http://nsfcac.rutgers.edu/GreenHPC/EEHiPC/eehipc_etinski.pdf.

HP, Intel, Microsoft, Phoenix, Toshiba. 2011. Advanced Configuration and Power Interface Specification Revision 5.0 http://www.acpi.info/DOWNLOADS/ACPIspec50.pdf.

Intel Corp. 2014. Intel 64 and IA-32 Architectures Software Developer Manuals. vol. 2 (2A, 2B, & 2C), total 1,495 pages. http://www.intel.com/content/www/us/en/processors/architectures-software-developer-manuals.html.

Lefurgy, C., et al., 2011. Energy-Efficient Data Centers and Systems. 2011 IEEE International Symposium on Workload Charac.

Mammela, O., et al., Energy-aware job scheduler for high-performance computing. Computer Science-Research and Development 27, No. 4 (2012): 265-275.

Matthieu, H., Power capping in SLURM. Green days @ life, Nov. 2013.

Roundtree, B., et al. 2012. Beyond DVFS: A First Look at Performance Under a Hardware-Enforced Power Bound. 8th Workshop on High-Performance, Power-Aware Computing (HPPAC). (May 2012). https://e-reports-ext.II.

2013. Slurm Workload Manager. (Nov. 2013). http://slurm.schedmd.com.

Yoo, A., et al. 2003. SLURM: Simple Linux utility for resource management. In, Feitelson, D., Rudolph, L. and Schwiegelshohn, U. editors. Job Scheduling Strategies for Parallel Processing. 9th Springer Verlag International Workshop, JS.

Zhou, Z., et al. 2013. Reducing Energy Costs for IBM Blue Gene/P via Power-Aware Job Scheduling. Department of Computer Science, Illinois Institute of Technology; Mathematics and Computer Science Division, Argonne National Laboratory.

PCT Notification of Transmittal of the International Search Report and the Written Opinion of the International Searching Authority or the Declaration for PCT Counterpart Application No. PCT/US2012/037812, 10 pages (dated Jan. 23, 2013).

PCT Notification concerning Transmittal of International Preliminary Report on Patentability (Chapter I of the Patent Cooperation Treaty) for PCT Counterpart Application No. PCT/US2012/037812, 7 pages, (dated Nov. 27, 2014).

PCT Written Opinion of the International Searching Authority for PCT Counterpart Application No. PCT/US2012/037812, 7 pages, (dated Nov. 27, 2014).

PCT International Search Report and Written Opinion received for PCT Patent Application No. PCT/US2012/038405, dated Feb. 28, 2013 8 pages.

PCT Notification concerning Transmittal of International Preliminary Report on Patentability (Chapter I of the Patent Cooperation Treaty) for PCT Counterpart Application No. PCT/US2012/038405, 7 pages (dated Nov. 27, 2014).

PCT International Search Report and Written Opinion received for PCT Patent Application No. PCT/US2012/036403, dated Sep. 4, 2015, 14 pages.

First Office Action (and English translation) from CN Application No. 200410101227.1, dated Dec. 1, 2006, 27 pages.

Abstract from W00219078, corresponding to reference CN 1449517A cited in CN OA above, 7 pages.

Office Action from UK Patent Application No. 0425264.9, dated Sep. 22, 2006, 7 pages.

Office Action from UK Patent Application No. 0609876.8, dated Sep. 22, 2006, 5 pages.

PCT Notification of Transmittal of the International Search Report and the Written Opinion of the International Searching Authority or the Declaration for PCT Counterpart Application No. PCT/US2012/036435, 16 pages, (dated Sep. 18, 2015).

"Activity Monitor Demystified", Skvorc, 2012, 21 pages.

Office Action for U.S. Appl. No. 14/582,764, dated Nov. 16, 2016, 16 pages.

Office Action for U.S. Appl. No. 14/582,764, 20 pages, dated Jun. 13, 2016.

Bodas, Deva., et al., "Simple Power-Aware Scheduler to limit power consumption by HPC system within a budget," E2SC '14 Proceedings of the 2nd International Workshop on Energy Efficient Supercomputing, pp. 21-30, Oct. 2014.

Office Action for U.S. Appl. No. 14/582,764, 13 pages, dated Mar. 14, 2017.

International Search Report for International Appln. No. PCT/US2015/036294, dated Sep. 25, 2015, 3 pgs.

PCT Written Opinion of the International Searching Authority for International Appln. No. PCT/US2015/036294, dated Sep. 25, 2015, 7 pgs.

International Preliminary Report on Patentability for International Application No. PCT/US2015/036294, dated Mar. 9, 2017, 8 pgs.

Zhai et al., HaPPy: Hyperthread-aware Power Profiling Dynamically, 2014 USENIX Annual Technical Conference, Jun. 2014.

Silberschatz et al., Operating System Concepts, 2013, John Wiley & Sons, Inc.

Office Action for counterpart U.S. Appl. No. 14/582,756, 28 pages, dated Jan. 12, 2017.

Office Action for counterpart U.S. Appl. No. 14/582,743, 38 pages, dated Mar. 9, 2017.

Supplementary European Search Report for European Patent Application No. EP15833962, dated Mar. 9, 2018.

Office Action for U.S. Appl. No. 14/582,743, dated Aug. 27, 2018, 39 pages.

Office Action issued in U.S. Appl. No. 10/859,892, dated Jul. 25, 2006, 10 pgs.

Office Action issued in U.S. Appl. No. 10/859,892, dated Dec. 6, 2006, 9 pgs.

Office Action from U.S. Appl. No. 10/871,638, dated Sep. 28, 2006, 13 pgs.

Laboratory. JSSPP 2013, total 20 pages. http://www.cs.huji.ac.il/.about.feit/parsched/jsspp13/zhou.pdf.

Karthik Ganesan et al: "System-level max power (SYMPO) ", Proceedings of the 19th International Conference on Parallel Architectures and Compilation Techniques, PACT '10, ACM Press, New York, New York, USA, Sep. 11, 2010 (Sep. 11, 2010), pp. 19-28.

International Preliminary Report on Patentability received for PCT Patent Application No. PCT/US2015/036435, dated Mar. 9, 2017, 13 pages.

International Preliminary Report on Patentability received for PCT Patent Application No. PCT/US2015/036403, dated Mar. 9, 2017, 10 pages.

(56) References Cited

OTHER PUBLICATIONS

Final Office Action issued in U.S. Appl. No. 14/582,772, dated Jul. 15, 2016, (dated Jul. 15, 2016), 13.
European Search Report and Search Opinion Received for EP Application No. 15833856.6, dated May 14, 2018, 14 pages.
Office Action for U.S. Appl. No. 14/582,772, dated Nov. 13, 2017, 21 pages.
Anonymous: "Benchmark (computing)—Wikipedia", Aug. 15, 2014 (Aug. 15, 2014), XP055458168, Retrieved from the Internet: URL:https://en.wikipedia.org/w/index.php?title=Benchmark (computing)&oldid=621396505.
"Office Action issued in U.S. Appl. No. 14/582,795, dated Jun. 1, 2016", 14.
"Office Action issued in U.S. Appl. No. 14/582,764, dated Jul. 14, 2017", 12.
"Office Action issued in U.S. Appl. No. 14/582,756, dated Feb. 16, 2016", 22.
"Office Action issued in U.S. Appl. No. 14/582,756, dated Aug. 25, 2016", 26.

\* cited by examiner

METHOD AND APPARATUS TO GENERATE AND USE POWER, THERMAL AND PERFORMANCE CHARACTERISTICS OF NODES TO IMPROVE ENERGY EFFICIENCY AND REDUCING WAIT TIME FOR JOBS IN THE QUEUE

CROSS-REFERENCE TO RELATED APPLICATIONS

The present application claims the benefit of prior U.S. Provisional Patent Application No. 62/040,576, entitled "SIMPLE POWER-AWARE SCHEDULER TO LIMIT POWER CONSUMPTION BY HPC SYSTEM WITHIN A BUDGET" filed on Aug. 22, 2014, which is hereby incorporated by reference in its entirety.

The present application is related to U.S. patent application Ser. No. 14/582,795 entitled Methods And Apparatus To Estimate Power Performance Of A Job That Runs On Multiple Nodes Of A Distributed Computer System filed Dec. 24, 2014; U.S. patent application Ser. No. 14/582,979 entitled Adjustment Of Execution Of Tasks filed Dec. 24, 2014; U.S. patent application Ser. No. 14/582,988 entitled Forecast For Demand Of Energy filed Dec. 24, 2014; U.S. patent application Ser. No. 14/582,772 entitled Methods And Apparatus To Manage Jobs That Can And Cannot Be Suspended When There Is A Change In Power Allocation To A Distributed Computer System, filed Dec. 24, 2014; U.S. patent application Ser. No. 14/582,743 entitled Managing Power Performance Of Distributed Computing Systems filed Dec. 24, 2014; U.S. patent application Ser. No. 14/582,756 entitled Profiling A Job Power And Energy Consumption For A Data Processing System filed Dec. 24, 2014; U.S. patent application Ser. No. 14/582,764 entitled Power Aware Job Scheduler And Manager For A Data Processing System filed Dec. 24, 2014.

FIELD

Embodiments of the disclosure generally relate to the field of power conservation in computer systems. More specifically, one embodiment of the disclosure relates to calibrating one or more nodes comprising a distributed computer system.

GENERAL BACKGROUND

A distributed computer system may perform parallel computing by the simultaneous use of multiple nodes to execute a computational assignment referred to as a job. Each node may include one or more processors, memory, an operating system, and one or more input/output (I/O) components. The nodes may communicate with each other through a high speed network fabric, e.g., an Ethernet, an Omni-Path, an InfiniBand, or other network, and may use shared file systems or storage. The job may be divided into thousands of parallel tasks distributed over thousands of nodes. These nodes may synchronize with each other hundreds of times a second.

Future distributed computer systems are projected to require tens of megawatts of power, making their power management a foremost concern in the industry. These distributed computer systems will be expected to deliver exascale performance with limited power and energy budgets. Current distributed computer systems may apply power capping to adhere to the limited power and energy budgets. However, current approaches to power capping negatively impact the performance of the distributed computer systems due to typically inaccurate power capping.

Current approaches estimate the power needed by one or more nodes of a distributed computer system to run a job based upon the thermal dissipation power (TDP) value of the one or more components comprising each node. As it is rare that a job actually uses the aggregate TDP value of each component of each node on which the job is run, the estimation using the aggregate TDP value results in an inaccurate estimate. By, for example, over-estimating the power needed to startup and run a job, current approaches may delay the start of the job and reduce the efficiency of the distributed computer system by preventing other jobs from running.

The start of running a job is delayed as the over-estimation of the necessary power to start the job causes the distributed computer system to delay the start of the job until the over-estimated startup power is available. Alternatively, a more accurate estimation of the startup power would avoid a delay of running the job. In addition, the over-estimation of the power required to run the job results in an over-allocation of power for the job. The over-allocation takes away from power that could be allocated to other jobs requesting to be run by the distributed computer system.

In addition, the aggregate TDP value is not the maximum power that may be consumed by a node. For example, the aggregate TDP value does not accurately measure the electrical power consumption when every component of the node is being used but measures the thermal dissipation. Therefore, it is possible that a job request may consume more power than the estimate derived from the aggregate TDP value which may lead to the distributed computer system attempting to consume more power than it has been allocated by a utility facility.

The TDP values of each component, and hence the aggregate TDP value, is also prone to inaccuracies due to a lack of uniformity between the compositions of each component on a node-to-node basis. For example, the actual thermal dissipation for a specific component in each node may vary between, for example, 70 W and 100 W. The publicized TDP value for the specific component may be, for example, 85 W. Therefore, an aggregate TDP may be inaccurate up to, for example, 15% for each component on each node resulting in a highly inaccurate power consumption estimate.

Additionally using current approaches, in order to run a job, a job manager may select a frequency at which to operate one or more nodes running the job. The frequency is typically selected based on an estimate of power consumption by the job. An over-estimate of power consumption leads to the selection of a first frequency. A more accurate estimation of the power consumption would result in the selection of a second frequency, the second frequency being higher than the first frequency; therefore. resulting in a shorter run-time.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
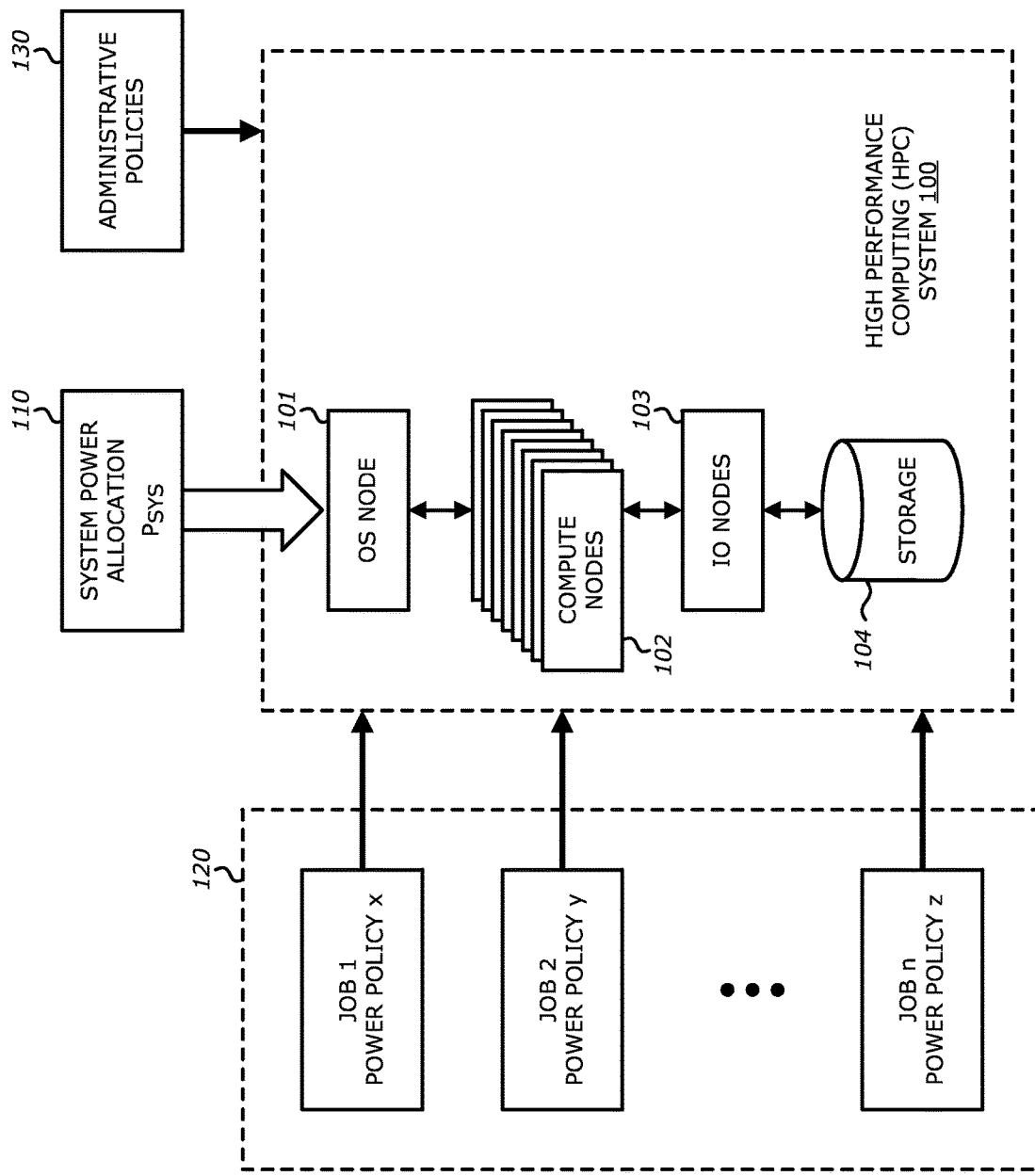
FIG. 1 is an exemplary block diagram of a HPC system 100 receiving a plurality of inputs.

Various embodiments of the disclosure relate to estimating the power performance of a job that is to be run on a distributed computer system. An estimation of the power performance of a job may be determined based on, at least in part, whether the owner of the job permits the job to be subject to a power limit, the job power policy limiting the power supplied to the job, whether the owner of the job permits the job to be suspended and/or terminated, and/or calibration data of the one or more nodes of the distributed computer system on which the job is to run. The distributed computer system may be, for example, a High Performance Computing (HPC) system. For simplicity, the discussion will use the term "HPC system," which should be interpreted as any computer system, for example, one or more of a HPC system, a desktop computer, a laptop computer, an enterprise server, a cloud server, or the like. In some embodiments of the disclosure, a job may not be subjected to a power policy that limits the power supplied to a job as set forth by the owner of the job; however, a HPC system may, and likely will, have an overall limited power budget that cannot be exceeded by the combination of jobs processed by the HPC system.

Embodiments of the disclosure relate to calibrating one or more nodes of a HPC system in order to obtain an accurate estimation for power allocation purposes. Some embodiments of the disclosure relate to the calibration of one or more nodes prior to processing a job while other embodiments of the disclosure relate to the calibration of one or more nodes during the processing of a job. Certain embodiments relate to the data collection and data processing that may occur during calibration. Still other embodiments of the disclosure may relate to populating a database based on data collected and processed during and/or after calibration on a per workload basis.

The HPC system may calibrate the nodes of the HPC system in order to use calibration data to estimate the power that should be allocated to a job based on a predetermined frequency at which the nodes selected to run the job will operate. The calibration may consist of running a workload (e.g., sample calculations/computations) on every node of the HPC system in order to sample one or more measurements (e.g., power consumption and/or temperature of each node). In addition, the calibration may take place on every node of the HPC system or, if the calibration is taking place simultaneously with one or more actual jobs, the available nodes may perform calibration.

The HPC system may include several calibration workloads that are to be run by each node for calibration purposes where each calibration workload represents the same or similar calculations/computations as one or more jobs. Therefore, calibration data derived from processing a specific workload may be used to generate a power and/or frequency estimate for a specific job as described in a related U.S. patent application Ser. No. 14/582,795 entitled "Methods and apparatus to estimate power performance of a job that runs on multiple nodes of a distributed computer system." The calibration may provide the HPC system with measurements such, but not limited or restricted to, a power level for each frequency for each node (e.g., a platform maximum power (PMP), a workload maximum power and/or a workload average power), a thermal measurement that enables the estimator to provide the HPC system with a power allocation and/or frequency estimation for a job that assists in managing a cooling system and/or a performance estimate (e.g., performance metric) for one or more frequencies of the selected nodes which allows a user (e.g., the owner of the job) to adjust the job request based on the estimated performance metric (e.g., the time until completion), the estimated power level and the estimated total energy consumption of the job. A workload maximum power of a node may be defined as the maximum observed power sampled while the node was being calibrated. The workload average power of a node may be defined as the average power of all of the power measurements sampled while the node was being calibrated.

Referring to FIG. 1, an exemplary block diagram of a HPC system receiving various inputs is shown. The HPC system 100 includes one or more operating system (OS) node 101 (also referred to as a head node), one or more compute nodes 102, one or more input/output (I/O) nodes 103 and a storage 104. A high-speed fabric communicatively connects the OS node 101, the compute nodes 102 and the I/O nodes 103. The high-speed fabric may be a network topology of nodes interconnected via one or more switches. In one embodiment, as illustrated in FIG. 1, the I/O nodes 103 are communicatively connected to the storage 104. The storage 104 may be non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device.

The OS node 101 may provide a gateway to accessing the compute nodes 102. For example, prior to submitting a job for processing on the compute nodes 102, a user may be required to log-in to the HPC system 100 which may be through the OS node 101. In embodiments of the disclosure, the OS node 101 may accept jobs submitted by users and assist in the launching and managing of jobs being processed by the compute nodes 102. In one embodiment, the OS node 101 comprises a power monitor (not shown), as described in the U.S. patent application Ser. No. 14/582,756 entitled "Methods and apparatus to profile power and energy consumption by a job running in multiple nodes and uses shared resources of a distributed computer system (HPC)"; a power estimator (not shown); and a power calibrator (not shown) described herein.

In one embodiment, the compute nodes 102 provide the bulk of the processing and computational power. The I/O nodes 103 may provide an interface between the compute nodes 102 and external devices (e.g., separate computers) that may provide input to the HPC system 100 or receive output from the HPC system 100.

The system power allocation ($P_{sys}$) may be provided to the HPC system 100 by, for example, a utility management facility (e.g., as determined by a system administrator or management software such as a datacenter manager). Typically, the $P_{sys}$ will be a limited amount of power allocated to the HPC system 100 with which the HPC system 100 will use to run one or more of the jobs 120. The jobs 120 comprise one or more jobs requested to be run by the HPC system 100 by one or more users. Each job includes a "power policy," which will be discussed in-depth below. The power policy will assist the HPC system 100 in allocating power for the job and aid in the management of the one or more jobs 120 being run by the HPC system 100.

In addition, the administrative policies 130 will guide the management of running the jobs 120 by providing an over-arching policy that defines the operation of the HPC system 100. Examples of policies that may be included in the administrative policies 130 include, but are not limited or restricted to, (1) maximize utilization of all hardware and software resources (e.g., instead of running fewer jobs at high power and leaving resources unused, run as many jobs as possible to use as much of the resources as possible); (2) a job with no power limit is given the highest priority among all running jobs; and/or (3) suspended jobs are at higher priority for resumption. Such administrative policies govern the way the HPC system 100 may schedule, launch, suspend and re-launch one or more jobs.

I. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "power monitoring" should be interpreted as dynamically measuring power consumption by one or more of the components comprising the HPC system. The measurements taken may be used to calculate power consumption by, for example, an individual job and/or a group of jobs, as well as to provide statistics on the overall power consumption of the HPC system.

The term "power policy" should be interpreted as an input (e.g., one or more parameters) provided to the HPC system that provide guidance on allocation and management of power for a given job. The input may be provided as part of a job request submission and/or may be provided as a separate input (e.g., via a user interface screen or a configuration file). For example, the input may indicate, among other things, (i) whether a job may be subjected to a power limit, (ii) the maximum and/or minimum power at which a job may run and/or (iii) a minimum and/or maximum frequency at which the one or more nodes processing the job may operate.

The term "node" should be construed as one or more processors optionally grouped with, at least, a system memory and/or one or more input/output (I/O) components. The one or more processors, the system memory and the one or more I/O components may be referred to as the "components" of a node throughout the specification and claims. Throughout the specification and claims, the terms "processor," "computer processing unit (CPU)," and "core" will be used interchangeably.

The term "job" should be interpreted as predetermined calculations performed on the HPC system. For example, a user (e.g., owner of the job) may request that a job be run by the HPC which means the user is requesting to have one or more compute nodes performing calculations according to input parameters and/or data provided by the user. The job request may specify the one or more calculations (e.g., an application) that are to be used for the processing of the job.

The term "system power ($P_{sys}$)" should be interpreted as the amount of power provided to the HPC system by, for example, a facility or datacenter manager. The $P_{sys}$ is the total amount of power the HPC system has to allocate to one or more jobs at any given time.

The term "guard band" should be interpreted as a mechanism to assist in the management of a power budget of a HPC system. In one embodiment, the guard band may an extra power allocation, which may be a predetermined percentage of the power allocated to the job. For example, if a HPC system has 3 MW of power to allocate to a job, the HPC system may only allocate 2.8 MW and maintain 0.2 MW as the guard band to prevent a spike in calculations to cause the power consumption of the job to exceed 3 MW. One purpose of the guard band is to maintain consistent power consumption by a job.

The term "platform max power (PMP)" should be interpreted as the power level measured for a node when the node is running a "power virus." The power virus is a workload, which may be an artificial workload created solely for calibration, that attempts to run each component of the node as much as possible while the power virus is being run. Therefore, the PMP is highest possible level of power a node may consume.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for power management of a distributed computer system, such as a High Performance Computing (HPC) system. In particular, embodiments of the disclosure relate to managing power allocation to one or more jobs run in a HPC system based on estimates of the power consumption for each job as a result of calibration of the nodes within the HPC system. As this invention is susceptible to embodiments of many different forms, it is intended that the present disclosure is to be considered as an example of the principles of the invention and not intended to limit the invention to the specific embodiments shown and described.

II. Power Aware Distributed Computer System

Figure 2:
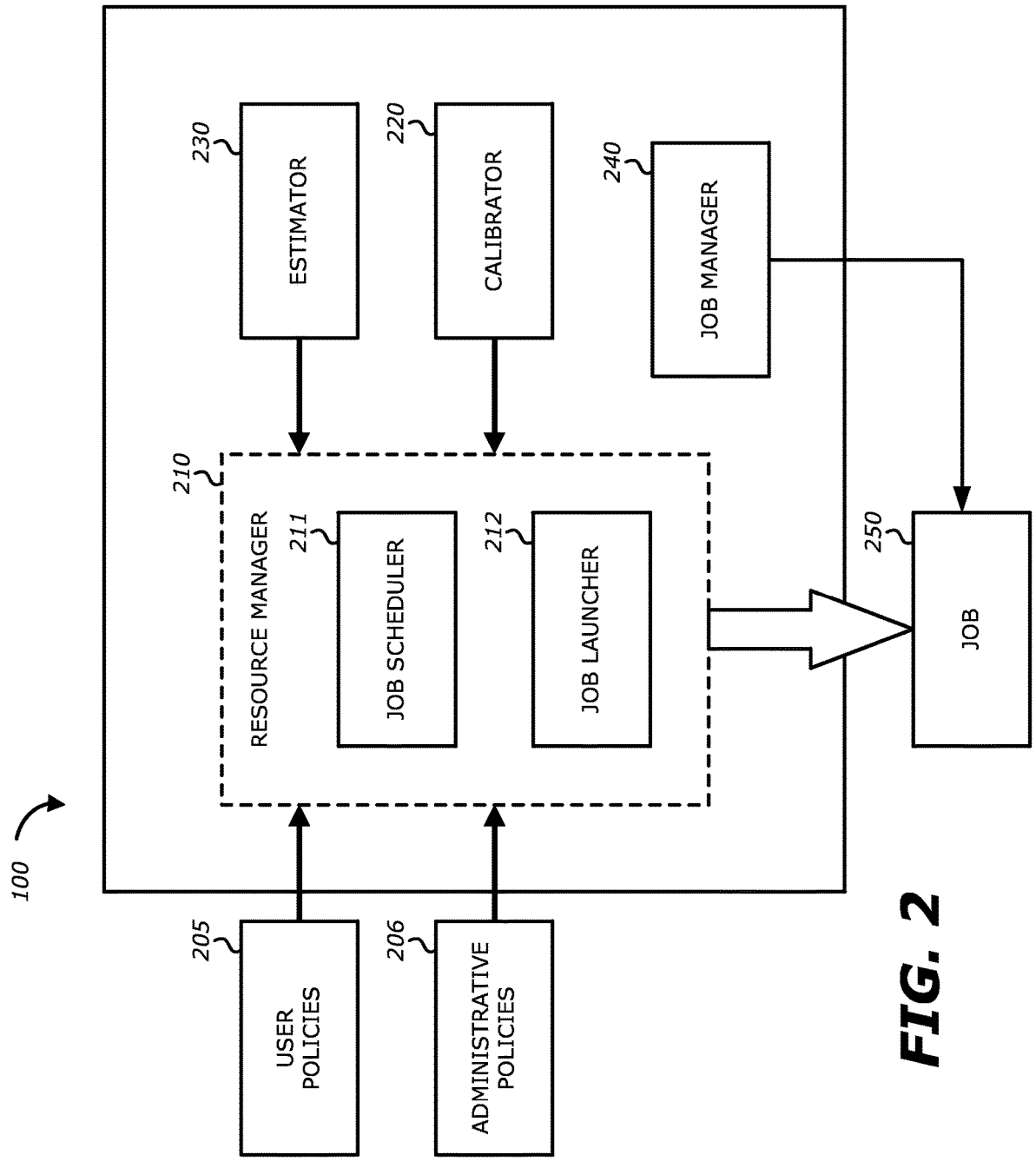
FIG. 2 is an exemplary block diagram of logic comprising the HPC system 100.

Referring to FIG. 2, an exemplary block diagram of logic comprising the HPC system 100 is shown. The logic of the HPC system 100 illustrated in FIG. 2 comprises the power management for the HPC system 100 and includes a resource manager 210 including a power aware job scheduler 211 and a power aware job launcher 212, a calibrator 220, an estimator 230, one or more job managers 240 (each job will have its own job manager), a job 250, the user policies 205 and the administrative policies 130. In one embodiment, the resource manager 210 and job manager 240 are configured to collect job power data.

The calibrator 220 calibrates the power, thermal dissipation and performance of each node within the HPC system 100. The calibrator 220 may provide a plurality of methods for calibrating the nodes within the HPC system 100. In one embodiment, the calibrator 100 may provide a first method of calibration in which every node within the HPC system 100 runs one or more sample workloads (e.g., a sample application, a portion of an application and/or a test script) so the calibrator 220 may sample one or more measurements (e.g., power consumed) at a predetermined time interval in order to determine, inter alia, (1) the average power, (2) the maximum power, and (3) the minimum power for each node. In addition, the sample workload may be run on each node at every operating frequency of the node. In another embodiment, the calibrator 220 may provide a second method of calibration in which calibration of one or more nodes occurs during the run-time of a job. In such a situation, the calibrator 220 may sample the one or more nodes on which a job is running (e.g., processing). In the second method, the calibrator 220 obtains power measurements of each node during actual run-time. In some embodiments, each node of the HPC system 100 is calibrated using a plurality of workloads, for example ten or twenty workloads.

The estimator 230 provides the resource manager 210 with estimates of power consumption for each job enabling the resource manager 210 to efficiently schedule and monitor each job requested by one or more job owners (e.g., users). The estimator 220 may provide a power consumption estimate based on, for example, maximum and average power values stored in a calibrator database, wherein the calibrator database is populated by the processing of the calibrator 220. In addition, the minimum power required for each job may be considered. Other factors that may be used by the estimator 230 to create a power consumption estimate include, but are not limited or restricted to, whether the owner of the job permits the job to be subject to a power limit, the job power policy limiting the power supplied to the job (e.g., a predetermined fixed frequency at which the job will run, a minimum power required for the job, or varying frequencies and/or power supplied determined by the resource manager 210), the startup power for the job, the frequency at which the job will run, the available power to the HPC system 100 and/or the allocated power to the HPC system 100.

The each job requested by a user (e.g., the owner of the job) is accompanied by a user policy 205 (also illustrated in FIG. 1). The user policy includes at least a decision on whether the job 250 may be subjected to a power limit, the policy to limit the power when power limit is permitted (e.g., fixed frequency, minimum power required, or varying frequency and/or power determined by the resource manager 210), and whether the job 250 may be suspended. The user policy will be discussed in-depth below with FIG. 3.

In one embodiment, a power aware job scheduler 211 is configured to receive a selection of a mode for a job (e.g., included within the user policies 205), to determine an available power for the job based on the mode and to allocate a power for the job based on the available power. In one embodiment, the power aware job scheduler 211 is configured to determine a uniform frequency for the job based on the available power. In one embodiment, the power aware job scheduler 211 is configured to determine the available power for the job based on at least one of a monitored power, an estimated power, and a calibrated power. The power aware job scheduler 211 and resource manager 210 are configured to receive information regarding power consumption, to distribute the power budget to each job, and to implement a uniform frequency mechanism to limit power, as described in further detail below.

The resource manager 210 uses power aware job scheduler 211 and power aware job launcher 212 to schedule and launch a job based on the received power inputs, e.g., the user policies 205 and the administrative policies 206. In one embodiment, the resource manager 210 is a software object that is responsible for allocation of compute and I/O resources for interactive and batch jobs that one or more users want to run. Typically, the resource manager 210 is also responsible for scheduling the jobs out of the job queue and launching the jobs to run as scheduled. A job manager 240 is configured to control a job to stay within an allocated power budget for the job, as described in further detail below. In one embodiment, the job manager 240 is responsible for operating a job within the constraints of one or more power policies after the job has been launched. In one embodiment, the job manager 240 is used to control power performance of all components (e.g., nodes, or other components) involved in execution of a job as per policies specified by at least one of the user and/or administrator. The power aware job scheduler 211 and the job manager 240 are described in the U.S. patent application Ser. No. 14/582,764 entitled "Methods and apparatus for a power aware job scheduler and manager to operate a distributed computing (HPC) within given power limits with high energy efficiency."

A. Exemplary Power Policy Selection User Interface

Figure 3:
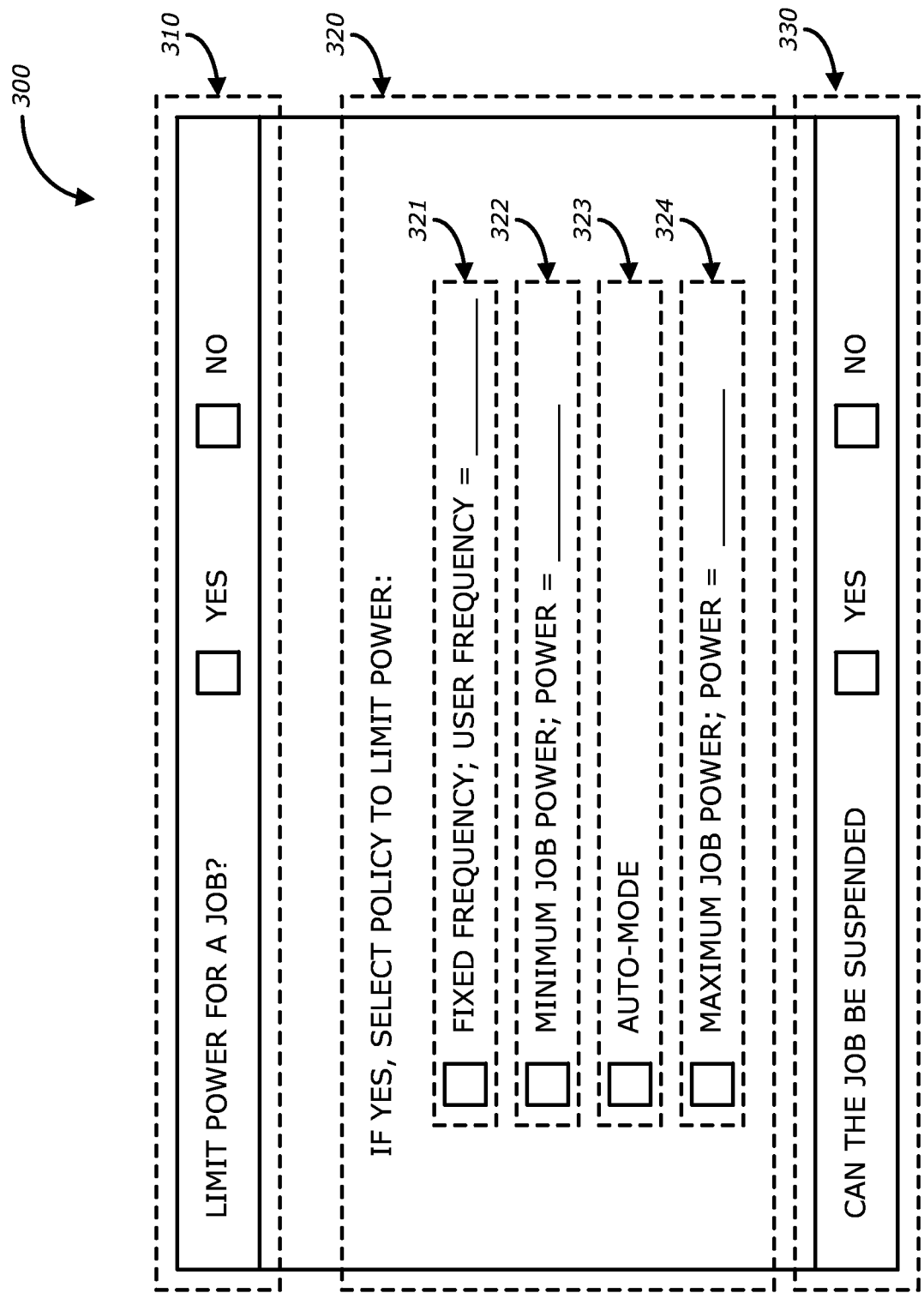
FIG. 3 is an exemplary embodiment of a user interface screen for designating a user policy while requesting a job be processed using the HPC system 100.

Referring to FIG. 3, an exemplary embodiment of a user interface screen for designating a user policy while requesting a job be processed using the HPC system 100 is shown. The user interface screen 300 includes the display area 310, 320 and 330. The display area 310 allows a user to designate whether the job, e.g., the job 250, is permitted to be subjected to a power limit.

The display area 320 pertains to the selection of one of a predetermined power-limiting policy when the user permits the job to be subjected to power limiting. In the embodiment shown in FIG. 3, the display area 320 provides four additional predetermined power-limiting policies 321-323. The power-limiting policy 321 is a fixed frequency policy ("Fixed-Frequency") in which the user designates a particular frequency at which the one or more nodes on which the job will run should operate. The power-limiting policy 322 is a minimum job power policy ("Minimum Job Power") in which the user designates a minimum power to be supplied to the one or more nodes on which the job 250 will run. The power-limiting policy 323 is an automatic mode ("Auto-mode") in which the resource manager 210 may vary the frequency at which the one or more nodes operate and/or the power supplied to the one or more nodes on which the job 250 is running. The power-limiting policy 324 is a maximum job power policy ("Maximum Job Power") in which the user designates a maximum power to be supplied to the one or more nodes on which the job 250 will run. The display area 330 pertains to the selection of whether the job 250 may be suspended during processing.

A user interface screen is not the only method for a user to provide the HPC system 100 with input parameters such as, for example, a power policy, a minimum required frequency, a minimum required power and/or whether the job may be suspended. Alternatively, such parameters may be provided to the HPC system 100 as part of the job submission and/or as a configuration file (e.g., text file). In yet another embodiment, such parameters may be set by a system administrator, a facility manager/administrator and/or predetermined as part of a user's account with the HPC system 100.

B. Exemplary Logical Structures of a Calibrator Module

Figure 4:
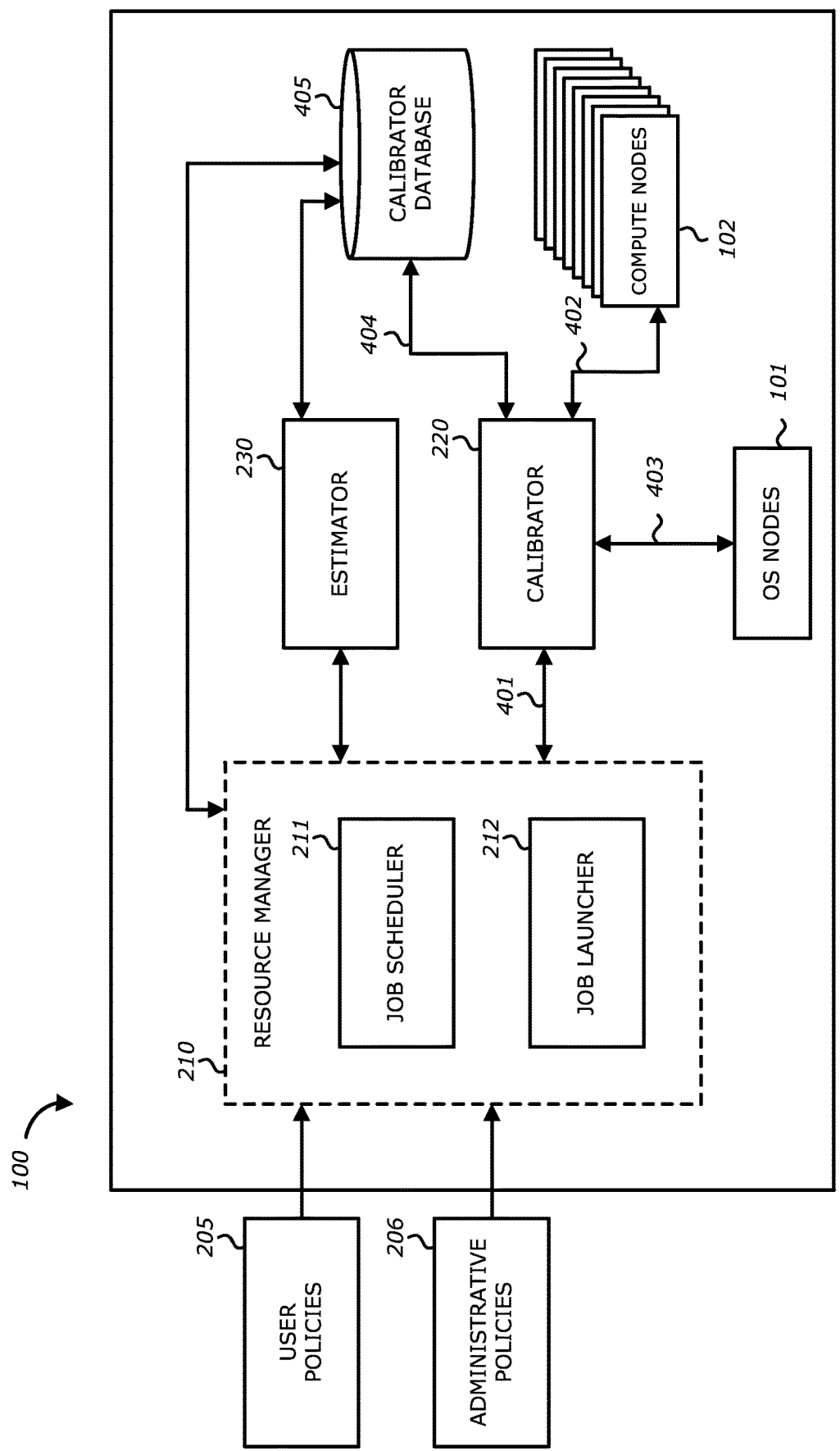
FIG. 4 is a second exemplary block diagram of logic comprising the HPC system 100.

Referring to FIG. 4, a second exemplary block diagram of logic comprising the HPC system 100 is shown. FIG. 4 illustrates interactions between the calibrator 220 and the OS node 101, the compute nodes 102 and a calibrator database 405 during a calibration period. The workload 401 is transmitted to the calibrator 220 when the resource manager 210 transmits a request for calibration. The workload 401 may be, for example, inter alia, a sample application (e.g., a "power virus"), a portion of a job and/or a test-script. A sample application may be a set of predetermined calculations that are specifically used to calibrate one or more of the compute nodes 102. The purpose of a sample application is to allow the calibrator 220 to calibrate the compute nodes 102 and allow the HPC system 100 to use the calibration results when processing job requests requiring similar computations (e.g., calculations) as the sample application.

In one embodiment, the workload 401 may be a portion of an actual job. In such an embodiment, a user may submit a job request for a job that either is not similar enough to a sample application to use the stored calibration results or may run for an extended period of time (e.g., several months) and the HPC system 100 and/or the user desires a portion of the job be used to calibrate the nodes in order to obtain calibration as close as possible to the actual power consumption and thermal dissipation that will occur during processing. For example, the user may provide the HPC system 100 with a portion of the job representative of the entire job or the HPC system 100 may determine a portion to use.

In another embodiment, the workload 401 may be a sample application. A power virus is a sample application that forces as many components as possible of each of the compute nodes 102 to consume as much power as possible for the entirety of the calibration. In one embodiment, each component of a compute node consumes the maximum amount of power when calibration is performed using a power virus. In contrast, a TDP value, as mentioned above, is a measurement of the thermal dissipation during processing; however, typically not every component will use power the entirety of actual processing. Therefore, the measurements taken during calibration using a power virus (e.g., associated with the "PMP" power policy) are typically higher than those of a TDP measurement. As a result, using the TDP value as a maximum power consumption value may be inaccurate. Therefore, unlike an estimation based on TDP values, an estimation based on PMP values ascertained from processing a power virus will prevent a job requested by a user from exceeding the power consumption estimate (e.g., when the job is not to be subjected to a power limit).

In addition, the workload 401 may be a clustered workload or a non-clustered workload. When a clustered workload is used, the calibrator 220 instructs an OS node 101 to start the processing of the clustered workload on a plurality of compute nodes 102. The processing of a clustered workload is divided up among the plurality of compute nodes 102 and requires communication between the compute nodes 102 and the OS node 101. In contrast, the calibrator 220 instructs a specific compute node of the compute nodes 102 to process a non-clustered workload. The processing of a non-clustered workload is not divided up among multiple compute nodes but instead is completed on a single compute node.

Figure 5:
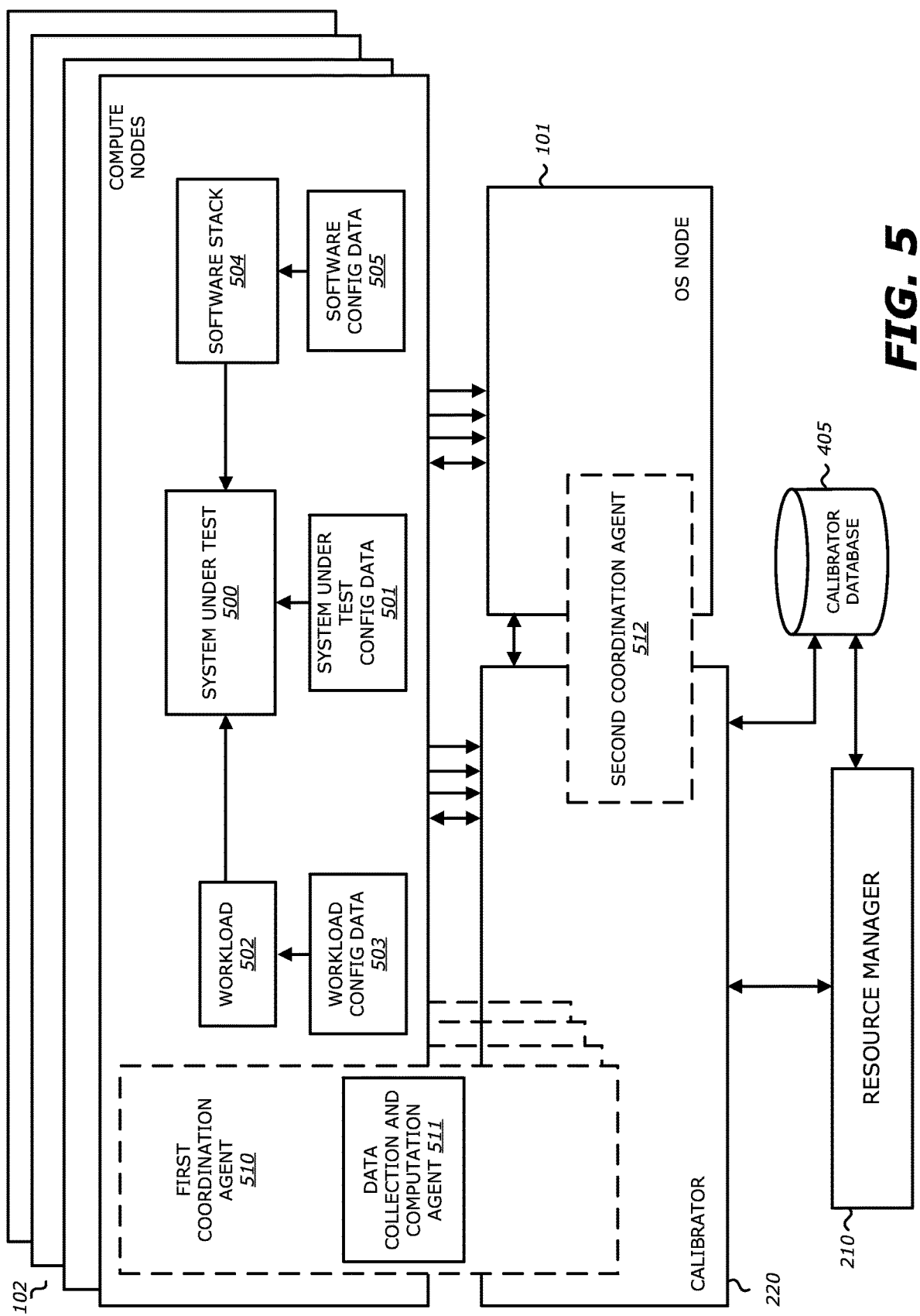
FIG. 5 is a third exemplary block diagram of logic comprising the HPC system 100.

Referring to FIG. 5, a third exemplary block diagram of logic comprising the HPC system 100 is shown. FIG. 5 illustrates detailed interactions of the compute nodes 102, the OS node 101, the calibrator 220 and the resource manager 210 within the HPC system 100. The calibrator 220 is seen to include a first coordination agent 510 and a second coordination agent 512. The first coordination agent 510 partly resides in the compute nodes 102 and includes a data collection and computation agent 511; therefore, the calibrator 220 may run on each of the compute nodes 102. When the calibrator 220 receives a calibration request from, for example, the resource manager 210, the calibrator 220 will initiate and manage the calibration process using the first coordination agent 510 and the second coordination agent 512. As will be discussed in detail below, the calibrator 220 may receive a calibration request for a clustered workload or a non-clustered workload. A clustered workload is a workload processed by a plurality of the compute nodes 102. When a request for a clustered workload is received, e.g., the workload 502, the calibrator 220, via the second coordination agent 512, communicates the request for the clustered workload, e.g., the workload 502, to the OS node 101. Subsequently, the OS node 101 instructs each of the compute nodes comprising the compute nodes 102 to initiate processing of a portion of the workload 502. The compute nodes 102 may communicate, for example, status updates and data from the processing of the workload 502 to the OS node 101. As will be described below, the data may be processed by each compute node independently with the results transmitted to the OS node or the data transmitted to the OS node 101 for processing. The data collection and computation agent 511 may perform the data collection and, optionally, the data computation on each of the compute nodes 102.

In contrast, a non-clustered workload is a workload that may be completed by a single compute node of the compute nodes 102, independent of any processing by other compute nodes of the compute nodes 102. When the calibrator 220 receives a request for a non-clustered workload, e.g., the workload 502, the calibrator 220, via the second coordination agent 512, communicates the request for the clustered workload to the OS node 101. The OS node 101 then directs each of the compute nodes 102 to perform the non-clustered workload 502. As with the clustered workload, the data collection and computation agent 511 may perform the data collection and, optionally, the data computation by each of the compute nodes 102.

The system under test 500 represents the hardware components of the compute nodes 102. Examples of hardware components comprising the system under test 500 include, but are not limited or restricted to, a processor, a memory device, one or more storage devices, I/O ports, etc. The system under test configuration data 501 provides configuration information to the system under test 500. In one embodiment, the calibrator 220 and/or the OS node 101 may provide configuration data to the system under test 500 via the system under test configuration data 501. For example, the calibrator 220 and/or the OS node 101 may designate one or more frequencies at which the processor of each of the compute nodes 102 should operate at while processing the workload 502.

The workload configuration data 503 may provide configuration data associated with the workload 502 of each of the compute nodes 102. For example, the workload configuration data 503 may provide instructions regarding the portion of the workload 502 to process to each of the compute nodes 102 when the workload 502 is a clustered workload.

The software stack 504 may provide one or more operating systems and/or software packages necessary to process the workload 502 to the system under test 500. In one embodiment, the software configuration data 505 may be used by the calibrator 220 and/or the OS node 101 to provide updates to the one or more operating systems and/or any software packages included in the software stack 504.

The results of processing the workload 502 by the compute nodes 102, regardless of whether the workload 502 is of the clustered type or non-clustered type, whether data from processing the workload 502 is processed on the compute nodes 102 or the OS node 101, or whether the calibration is of an on-demand method or a run-time method (as discussed below), may be stored in the calibrator database 405.

C. Example Calibration Methods

Figure 6:
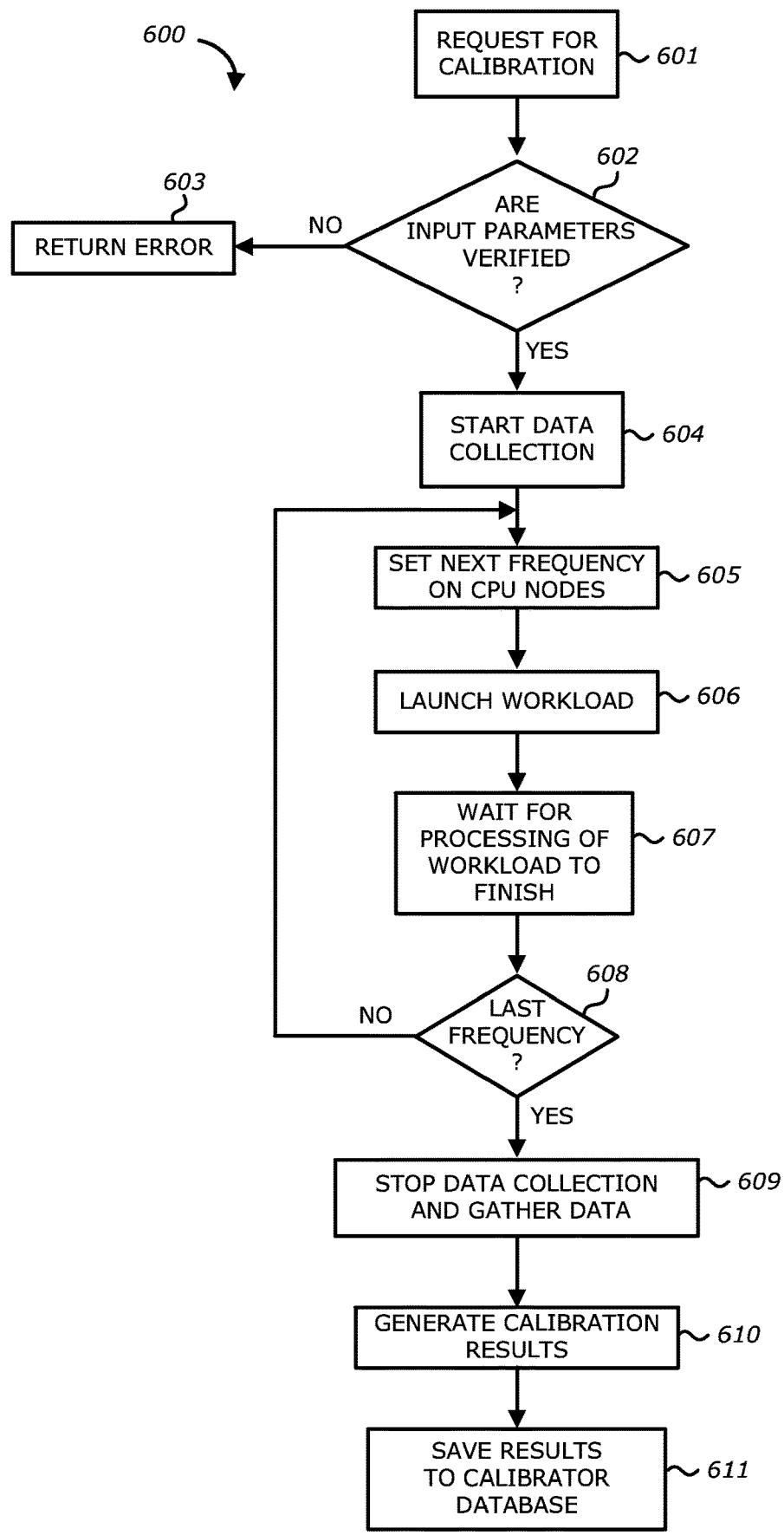
FIG. 6 is a flowchart illustrating an exemplary method for performing calibration by the HPC system 100 according to a received calibration request.

Referring to FIG. 6, a flowchart illustrating an exemplary method of calibration is shown. Each block illustrated in FIG. 6 represents an operation performed in the method 600 of calibrating one or more compute nodes 102. The method 600 illustrates operations conducted by the estimator 220 on the OS node 101 and the compute nodes 102 in efforts to, automatically, without human interaction, process a workload for calibration purposes by the compute nodes 102. As was discussed in FIG. 5, a portion of the estimator 220 runs on both the OS node 101 and the compute nodes 102. In operation 601, the estimator 220 receives a request for calibration. The request for calibration comprises one or more input parameters including, for example, a load command, a workload type, a list of one or more compute nodes of the compute nodes 102, a list of frequencies, an averaging time, a cooling off period, an idle period, etc. A load command may be an instruction to execute the workload including the name of one or more files comprising the workload, the file location of each file and/or additional parameters regarding the workload. The averaging time may be a time over which the sampling of the nodes running the job is to be averaged. A cooling off period may be a period of time after the completion of a workload in order to allow the temperature of the nodes that processed the job to decrease such that the processing of a first job does not affect the sampling the during processing of a second job.

In operation 602, the input parameters included in the calibration request are verified. The verification process may include, among others, determining whether each compute node listed is available and/or operational (e.g., functioning properly), determining whether all of the frequencies listed are supported by the compute nodes 102 and/or the workload type is supported by the compute nodes 102 (e.g., determination of the workload type may occur during verification of the input). When the input cannot be verified (e.g., one or more frequencies listed are not supported by the compute nodes 102) (no at operation 602), the calibration method 600 is stopped and an error is returned to the HPC system 100 (operation 603). Alternatively, but not illustrated, the calibration method 600 proceeds while disregarding the erroneous input parameter(s) (e.g., the one or more compute nodes 102 that are not operational or are not available are not used in the processing of the workload, one or more listed compute nodes are not available/operational, a workload type is not supported, etc.).

When the input parameters can be verified (yes at operation 602), the data collection is started (operation 604). For example, the data collection and computation 511 of FIG. 5 may begin sampling one or more measurements from the system under test 500 for each of the compute nodes 102 at a predetermined time interval. Examples of the one or more measurements sampled by the calibrator 220 include, but are not limited or restricted to, time stamps of, for example, the start and end of the processing of the workload 401, the power being consumed by each component of each compute node of the subset of the compute nodes 102, voltage and current applied to each compute node of the subset of the compute nodes 102, the temperature of each component of each compute node of the subset of the compute nodes 102, the configuration settings of each compute node of the subset of the compute nodes 102, latencies each of compute node of the subset of the compute nodes 102 and/or bandwidth usage of each compute node of the subset of the compute nodes 102.

At operation 605, a frequency from the list of frequencies received as an input parameter in operation 601 is set as the frequency at which the processors of the compute nodes 102 are to operate while processing the workload. At operation 606, the workload is launched. As will be discussed below, in one embodiment, relating to a clustered workload, the workload may be launched by the OS node 101 on a plurality of compute nodes 102 such that the compute nodes 102 jointly process the workload. In another embodiment, relating to a non-clustered workload, the OS node 101 may provide the compute nodes 102 with a load command instructing the compute nodes 102 to launch a workload on each of the compute nodes 102 such that each compute node of the compute nodes 102 processes a workload independently. In other embodiments, a plurality of load commands may be provided to the compute nodes 102 at one time. In such an embodiment, the compute nodes 102 may perform calibration of a first workload and upon completion of the calibration of the first workload, perform calibration of a second workload (e.g., after a cooling period has passed). The compute nodes 102 may continually perform calibration of the plurality of workloads, at each frequency provided, until calibration has been performed on each of the workloads of the plurality of workloads.

At operation 607, the HPC system 100 waits for the processing of the workload on the compute nodes 102 to complete. While the HPC system 100 is waiting at operation 607, the data collection and computation agent 511 on each of the compute nodes 102 continues to sample the one or more measurements at the predetermined intervals.

At operation 608, the calibrator 220 analyzes the list of frequencies received as an input parameter in operation 601 and determines whether the current frequency set as the operating frequency (e.g., set in operation 605) is the last frequency on the list of frequencies. If the current frequency at which the compute nodes 102 are operating is not the last frequency on the list of frequencies (no at operation 608), the calibrator returns to operation 605 wherein the next frequency on the list of frequencies is set as the current frequency at which the compute nodes 102 are to operate, and operations 606-608 are repeated as described above.

However, if the current frequency at which the compute nodes 102 are operating is the last frequency on the list of frequencies (yes at operation 608), the calibrator 220 stops the data collection (operation 609). In one embodiment, this may include the data collection and computation agent 511 of the calibrator located on each of the compute nodes 102 stopping sampling the one or more measurements as described above.

At operation 610, calibration results are generated. As will be discussed below, in one embodiment, the collected measurements may be processed by each of the compute nodes 102 (e.g., via the data collection and computation agent 511 of the calibrator 220) or the OS node 101 may process the collected measurements. In another embodiment, the collected measurements may be collected and processed by the OS node 101. The generation of the calibration results may comprise the processing of the collected measurements and/or the gathering and combining of the processed collected measurements.

At operation 611, the calibration results are saved to the calibrator database 405. In one embodiment, the calibration results may be organized in the calibrator database 405 on a per compute node basis (e.g., a separate table for each of the compute nodes 102). Additionally, the calibration data pertaining to a single compute node may be further organized on a per workload basis (e.g., a separate table for each of the workloads for each of the compute nodes 102). Each table may include one or more of the collected measurements and may organize the one or more collected measurements by each frequency at which the compute node was operating when the measurements were collected.

The type of workload launched, as mentioned at operation 606 above, may be clustered or non-clustered. A clustered workload is launched by the OS node 101 and includes a portion of the workload being processed on a plurality of the compute nodes 102. The OS node 101 instructs each of the compute nodes 102 as to what portion of the workload to process, e.g., by updating the workload configuration data 503 of each of the compute nodes 102. In one embodiment, all measurements collected as a result of processing a clustered workload are gathered by and processed on the OS node 101.

In one embodiment, the OS node 101 may provide a load command to the compute nodes 102 which provide the compute nodes 102 instructions to launch a non-clustered workload may be launched by the OS node 101 or by the calibrator 220. In contrast to a plurality of compute nodes processing a single clustered workload, the processing of a non-clustered workload is completed, in its entirety, on a single compute node. In one embodiment, when the calibrator 220 receives a request for calibration of a non-clustered workload, the workload will be processed on each of the compute nodes 102 and the processing of the non-clustered workload will not require communication between the compute nodes 102 through the OS node 101.

Multiple variations of the gathering and processing of the collected measurements are available to the HPC system 100. In a first embodiment, all measurements are collected on each of the compute nodes 102 during processing and all calculations included in the processing are performed on each of the compute nodes 102 (e.g., on the data collection and computation agent 511). The processed measurements may be subsequently transmitted to the OS node 101, or directly to the calibrator 220, for further organization and computation of overall metrics for the entire workload (e.g., an overall performance metric). In a second embodiment, all measurements are collected on each of the compute nodes 102 and, after processing of the workload, or portion of the workload, is complete, each of the compute nodes 102 transmits the unprocessed collected measurements to the OS node 101 for processing. In a third embodiment, all of the measurements are collected on each of the compute nodes 102 and transferred to the OS node 101, periodically, while processing of the workload, or actual job, is still being performed. The third embodiment may allow dynamic updating of the power allocation to the job being processed, as will be described below with reference to the run-time calibration method.

Examples of the processing of the collected measurements include, but are not limited or restricted to, computing the average power consumed by each component and/or each node (e.g., an arithmetic average or a running average), determining a peak power value (maximum power value sampled), determining a minimum power value sampled, determining a maximum power of the running average ($P_{max}$), determining a minimum power of the running average ($P_{min}$), computing the average temperature of each component and/or each node (e.g., an arithmetic average or a running average), determining a peak temperature (maximum temperature sampled), determining a minimum temperature value sampled, computing a maximum temperature of the running average ($T_{max}$) and/or computing a minimum power of the running average ($T_{min}$).

As a third aspect of a calibration request type, a calibration request may require the use of either of two calibration methods: (1) on-demand or (2) run-time. As will be discussed below, a calibration request requiring on-demand calibration may perform calibration using a workload while the one or more compute nodes on which the calibration is to be performed are not processing an actual job. In contrast, a calibration request requiring run-time calibration may perform calibration by sampling the compute nodes while processing an actual job.

a. On-Demand Calibration

On-demand calibration includes performing calibration of the compute nodes 102 using a workload 401 of either a sample application, a portion of a job and/or a test-script. While at least a subset of the compute nodes 102 are not performing processing on an actual job, the calibrator 220 may calibrate the subset of the compute nodes 102. In the request for calibration, the resource manager 210 provides the calibrator 220 with the subset of the compute nodes 102 on which the calibration should be performed. The subset of the compute nodes 102 may include one or more of the compute nodes 102. The subset of the compute nodes 102 may be one or more, including all, of the compute nodes 102.

When the calibrator 220 starts the calibration, the calibrator 220 will run the workload 401 on the subset of the compute nodes 102 as instructed by the resource manager 210 at each frequency at which the compute nodes 102 may operate. The calibrator 220 will begin the calibration by processing the workload 401 on the subset of the compute nodes 102 operating at a first frequency. Upon the completion of the processing of the workload 401 at the first frequency, the calibrator 220 will process the workload 401 on subset of the compute nodes 102 at a second frequency;

this process will continue until the workload 401 has been processed at every frequency at which the compute nodes 102 may operate (as is illustrated in FIG. 6).

During processing of the workload 401 at each frequency, the calibrator 220 samples one or more measurements at predetermined time intervals. For example, with the subset of compute nodes 102 processing the workload 401 at frequency $F_1$, the calibrator 220 may sample the one or more parameters every 100 milliseconds (ms) until the processing of the workload 401 is complete. It is obvious that the predetermined time interval need not be 100 ms but may be any time interval.

Sampling of the one or more measurements at predetermined time intervals allows the calibrator 220 to compute performance metrics such as, inter alia, the average power consumed per node ($P_{avg}$), the highest power value sampled ($P_{peak}$), the maximum value observed for a running average ($P_{max}$, alternatively referred to as "workload max" or "workload maximum"), the lowest power value sampled, etc. The calculation of $P_{avg}$ and other values will be discussed in detail below.

a. Run-Time Calibration

Run-time calibration includes performing calibration of the compute nodes 102 using an actual job and sampling one or more components of each of the compute nodes 102 running the job during the actual processing of the job. Run-time calibration enables an HPC system 100 to obtain calibration data for the compute nodes 102 that is based on actual processing. Therefore run-time calibration provides the HPC system 100 with the most accurate data possible. The run-time calibration data is advantageous in at least two situations. First, when the job will be run multiple times, run-time calibration provides accurate calibration data for the subsequent processing of the job. Second, when a job will run for an extended period of time (e.g., several months), run-time calibration may allow the HPC system 100 to dynamically adjust the power allocated for the job.

Based upon the two situations discussed above, run-time calibration may be performed using two methods: (1) static run-time calibration and (2) dynamic run-time calibration. Static run-time calibration includes performing calibration by sampling the one or more measurements at predetermined time intervals, as discussed above, as the compute nodes 102 process the job and storing the sampled one or more measurements. Processing of the one or more measurements to compute, for example, inter alia, $P_{avg}$ and/or $P_{peak}$, can be done after the processing of the job is complete. The calibration data (e.g., the processed one or more measurements), may be stored in the calibrator database 405 for use by the estimator 230 when the estimator 230 is to provide a power estimation for a subsequent processing of the job (e.g., the same calculations/computations with varied input parameters).

Dynamic run-time calibration includes performing calibration by sampling the one or more measurements at predetermined time intervals and processing the one or more measurements, as discussed above, as the compute nodes 102 process the job. With dynamic run-time calibration, the performance metrics are updated dynamically. For example, the $P_{avg}$ may be updated continuously as the compute nodes 102 are sampled. Run-time calibration does not necessarily perform sampling at each frequency at which the compute nodes 102 may operate. For example, the run-time calibration may be performed at a frequency selected by the job manager. In a second embodiment in which the owner selects a minimum frequency at which to run the job, the run-time calibration will not sample the one or more measurements for calibration purposes below the minimum frequency.

In one embodiment, the $P_{avg}$ may be computed as:

$$P_{avg} = P_{avg\_old} + (P_{current} - P_{avg\_old})\left(\frac{sample\_time}{averaging\_time}\right) \quad \text{equation 1.0}$$

In the above equation, $P_{avg\_old}$ represents the $P_{avg}$ prior to the latest sampling, $P_{current}$ represents the current power value from the latest sample, sample_time represents the duration of the time interval in between samplings and averaging_time represents the time over which the $P_{avg}$ is desired (e.g., $P_{avg}$ over 50 ms). The equation 1.0 illustrates that the $P_{avg}$ can be updated dynamically as each sample is taken. Furthermore, the calibrator database 405 may be updated with the dynamic $P_{avg}$ after each sampling in order to provide the most current performance metrics to the HPC system 100. In addition, the same performance metrics may be computed for temperature measurements. Examples of temperature metrics include, but are not limited or restricted to, $T_{avg}$, $T_{peak}$, $T_{max}$ and/or $T_{min}$.

In one embodiment, the HPC system 100 may dynamically adjust the power allocated to the job during its processing (e.g., the estimator 230 may provide estimations for power consumption of the job at predetermined time intervals). When the job is expected to run for an extended amount of time (e.g., several months), the HPC system 100 may benefit from dynamically allocating power to the job. For example, the HPC system 100 may decrease the power allocated to the job if the performance metrics, computed dynamically, illustrate a trend of decreasing power consumption (e.g., a period of less complex computations).

In another embodiment, the calibrator 220 may disregard an initial subset of samplings when computing some of the performance metrics. For example, when determining the $P_{min}$, as the lowest $P_{avg}$ value, and $P_{max}$, as the highest $P_{avg}$ value, the calibrator 220 may disregard an initial subset of the $P_{avg}$ values. For example, if the averaging_time for $P_{avg}$ is 50 ms and the sample_time is 10 ms, the calibrator 220 may disregard the first five values of $P_{avg}$, alternatively, the calibrator 220 may disregard any number of initial values of $P_{avg}$ such as the first ten or first 15 values of $P_{avg}$.

As discussed briefly above, with both on-demand calibration and run-time calibration, the processing of the calibration (e.g., to form performance metrics such as $P_{avg}$ and $P_{peak}$) may be performed (1) during calibration and/or (2) after calibration. In addition, the processing of the calibration may be performed (a) on the compute nodes 102 on which the sampling is being performed and/or (b) on the OS node 101.

The following examples pertain to further embodiments:

A non-transitory computer readable storage medium having stored thereon instructions, the instructions being executable by one or more processors to perform operations including receiving, by a calibration module executed by the one or more processors, a calibration request including (i) a workload type, (ii) a list of compute nodes belonging to a distributed computer system, and (iii) one or more frequencies, responsive to identifying the workload type as a clustered workload type, instructing a plurality of compute nodes on the list of compute nodes to begin processing a workload of the workload type and responsive to identifying the workload type as a clustered workload type, instructing a compute node on the list of compute nodes to begin processing the workload of the workload type.

A non-transitory computer readable storage medium having stored thereon instructions, the instructions being executable by one or more processors to perform operations including receiving, by a calibration module executed by the one or more processors, a calibration request including (i) a workload type, (ii) a list of compute nodes belonging to a distributed computer system, and (iii) one or more frequencies, responsive to identifying the workload type as a clustered workload type, instructing a plurality of compute nodes on the list of compute nodes to begin processing a workload of the workload type and responsive to identifying the workload type as a clustered workload type, instructing a compute node on the list of compute nodes to begin processing the workload of the workload type, wherein, when the workload is the clustered workload type, the processing of the workload is completed through one or more calculations of the workload being computed on each of the plurality of compute nodes, wherein results of the one or more calculations are communicated to a head node.

A non-transitory computer readable storage medium having stored thereon instructions, the instructions being executable by one or more processors to perform operations including receiving, by a calibration module executed by the one or more processors, a calibration request including (i) a workload type, (ii) a list of compute nodes belonging to a distributed computer system, and (iii) one or more frequencies, responsive to identifying the workload type as a clustered workload type, instructing a plurality of compute nodes on the list of compute nodes to begin processing a workload of the workload type, responsive to identifying the workload type as a clustered workload type, instructing a compute node on the list of compute nodes to begin processing the workload of the workload type, when the workload is the non-clustered workload type, the processing of the workload in an entirety is completed on the compute node.

A non-transitory computer readable storage medium having stored thereon instructions, the instructions being executable by one or more processors to perform operations including receiving, by a calibration module executed by the one or more processors, a calibration request including (i) a workload type, (ii) a list of compute nodes belonging to a distributed computer system, and (iii) one or more frequencies, responsive to identifying the workload type as a clustered workload type, instructing a plurality of compute nodes on the list of compute nodes to begin processing a workload of the workload type, responsive to identifying the workload type as a clustered workload type, instructing a compute node on the list of compute nodes to begin processing the workload of the workload type and responsive to beginning processing of the workload of the workload type, sampling one or more measurements of one or more components of each compute node processing the workload to collect one or more measurements.

A non-transitory computer readable storage medium having stored thereon instructions, the instructions being executable by one or more processors to perform operations including receiving, by a calibration module executed by the one or more processors, a calibration request including (i) a workload type, (ii) a list of compute nodes belonging to a distributed computer system, and (iii) one or more frequencies, responsive to identifying the workload type as a clustered workload type, instructing a plurality of compute nodes on the list of compute nodes to begin processing a workload of the workload type, responsive to identifying the workload type as a clustered workload type, instructing a compute node on the list of compute nodes to begin processing the workload of the workload type and responsive to beginning processing of the workload of the workload type, sampling one or more measurements of one or more components of each compute node processing the workload to collect one or more measurements, wherein the sampling the one or more measurements includes continuously measuring of a compute node on the list of compute nodes, at a predetermined time interval, one or more of a power being currently consumed by a component of the compute node, a voltage applied to a component of the compute node, a current applied to a component of the compute node, a temperature of a component of the compute node, a configuration setting of the compute node, a latency of the compute node, or a bandwidth usage of the compute node.

A non-transitory computer readable storage medium having stored thereon instructions, the instructions being executable by one or more processors to perform operations including receiving, by a calibration module executed by the one or more processors, a calibration request including (i) a workload type, (ii) a list of compute nodes belonging to a distributed computer system, and (iii) one or more frequencies, responsive to identifying the workload type as a clustered workload type, instructing a plurality of compute nodes on the list of compute nodes to begin processing a workload of the workload type, responsive to identifying the workload type as a clustered workload type, instructing a compute node on the list of compute nodes to begin processing the workload of the workload type, responsive to beginning processing of the workload of the workload type, sampling one or more measurements of one or more components of each compute node processing the workload to collect one or more measurements, responsive to sampling the one or more measures of the one or more components of each compute node, generating calibration results from the sampled one or more measurements and responsive to generating the calibration results, storing the calibration results in a calibration database.

A non-transitory computer readable storage medium having stored thereon instructions, the instructions being executable by one or more processors to perform operations including receiving, by a calibration module executed by the one or more processors, a calibration request including (i) a workload type, (ii) a list of compute nodes belonging to a distributed computer system, and (iii) one or more frequencies, responsive to identifying the workload type as a clustered workload type, instructing a plurality of compute nodes on the list of compute nodes to begin processing a workload of the workload type, responsive to identifying the workload type as a clustered workload type, instructing a compute node on the list of compute nodes to begin processing the workload of the workload type and responsive to beginning processing of the workload of the workload type, sampling one or more measurements of one or more components of each compute node processing the workload to collect one or more measurements, wherein the sampling includes: collecting the one or more measurements of the one or more components of a first compute node on the list of compute nodes by the first compute node, and processing the one or more measurements by the first compute node.

A non-transitory computer readable storage medium having stored thereon instructions, the instructions being executable by one or more processors to perform operations including receiving, by a calibration module executed by the one or more processors, a calibration request including (i) a workload type, (ii) a list of compute nodes belonging to a distributed computer system, and (iii) one or more frequencies, responsive to identifying the workload type as a clustered workload type, instructing a plurality of compute nodes on the list of compute nodes to begin processing a workload of the workload type, responsive to identifying the workload type as a clustered workload type, instructing a compute node on the list of compute nodes to begin processing the workload of the workload type and responsive to beginning processing of the workload of the workload type, sampling one or more measurements of one or more components of each compute node processing the workload to collect one or more measurements, wherein the sampling includes: collecting the one or more measurements of the one or more components of a first compute node on the list of compute nodes by the first compute node, transmitting the collected one or more measurements to a head node of the distributed computer system, and processing the one or more measurements by the head node.

A non-transitory computer readable storage medium having stored thereon instructions, the instructions being executable by one or more processors to perform operations including receiving, by a calibration module executed by the one or more processors, a calibration request including (i) a workload type, (ii) a list of compute nodes belonging to a distributed computer system, and (iii) one or more frequencies, responsive to identifying the workload type as a clustered workload type, instructing a plurality of compute nodes on the list of compute nodes to begin processing a workload of the workload type, responsive to identifying the workload type as a clustered workload type, instructing a compute node on the list of compute nodes to begin processing the workload of the workload type and responsive to beginning processing of the workload of the workload type, sampling one or more measurements of one or more components of each compute node processing the workload to collect one or more measurements, wherein the sampling includes: collecting the one or more measurements of the one or more components of a first compute node on the list of compute nodes by the first compute node, transmitting, at a predetermined time interval during the collecting, the collected one or more measurements to a head node of the distributed computer system, and processing, during the collecting, the one or more measurements by the head node.

A non-transitory computer readable storage medium having stored thereon instructions, the instructions being executable by one or more processors to perform operations including receiving, by a calibration module executed by the one or more processors, a calibration request including (i) a workload type, (ii) a list of compute nodes belonging to a distributed computer system, and (iii) one or more frequencies, responsive to identifying the workload type as a clustered workload type, instructing a plurality of compute nodes on the list of compute nodes to begin processing a workload of the workload type, responsive to identifying the workload type as a clustered workload type, instructing a compute node on the list of compute nodes to begin processing the workload of the workload type, responsive to beginning processing of the workload of the workload type, sampling one or more measurements of one or more components of each compute node processing the workload to collect one or more measurements, responsive to sampling the one or more measurements of the one or more components of each compute node, generating calibration results from the processed one or more measurements and adjusting a power allocated for a job based on the calibration results, wherein the workload is the job, requested by a user, and the sampling includes: collecting the one or more measurements of the one or more components of a first compute node on the list of compute nodes by the first compute node, transmitting, at a predetermined time interval during the collecting, the collected one or more measurements to a head node of the distributed computer system, and processing, during the collecting, the one or more measurements by the head node A non-transitory computer readable storage medium having stored thereon instructions, the instructions being executable by one or more processors to perform operations including receiving, by a calibration module executed by the one or more processors, a calibration request having input parameters including (i) a workload type, (ii) a plurality of compute nodes belonging to a distributed computer system, and (iii) a plurality of frequencies, responsive to verification of the input parameters, setting a first frequency of the plurality of frequencies as an operating frequency of processors of each the plurality of compute nodes, performing calculations from a workload of the workload type on a processor of a compute node of the plurality of compute nodes operating at the first frequency, responsive to the completion of the performing of the calculations, setting a second frequency of the plurality of frequencies as the operating frequency of the processors of each of the plurality of compute nodes and performing the calculations from the workload on the processor of the compute node operating at the second frequency.

A non-transitory computer readable storage medium having stored thereon instructions, the instructions being executable by one or more processors to perform operations including receiving, by a calibration module executed by the one or more processors, a calibration request having input parameters including (i) a workload type, (ii) a plurality of compute nodes belonging to a distributed computer system, and (iii) a plurality of frequencies, responsive to verification of the input parameters, setting a first frequency of the plurality of frequencies as an operating frequency of processors of each the plurality of compute nodes, performing calculations from a workload of the workload type on a processor of a compute node of the plurality of compute nodes operating at the first frequency, responsive to the completion of the performing of the calculations, setting a second frequency of the plurality of frequencies as the operating frequency of the processors of each of the plurality of compute nodes and performing the calculations from the workload on the processor of the compute node operating at the second frequency, wherein, when the workload is the clustered workload type, processing of the workload is completed through performance of the calculations using the processors of each of the plurality of compute nodes, and results of the processing are communicated to a head node of the distributed computer system.

A non-transitory computer readable storage medium having stored thereon instructions, the instructions being executable by one or more processors to perform operations including receiving, by a calibration module executed by the one or more processors, a calibration request having input parameters including (i) a workload type, (ii) a plurality of compute nodes belonging to a distributed computer system, and (iii) a plurality of frequencies, responsive to verification of the input parameters, setting a first frequency of the plurality of frequencies as an operating frequency of processors of each the plurality of compute nodes, performing calculations from a workload of the workload type on a processor of a compute node of the plurality of compute nodes operating at the first frequency, responsive to the completion of the performing of the calculations, setting a second frequency of the plurality of frequencies as the operating frequency of the processors of each of the plurality of compute nodes and performing the calculations from the workload on the processor of the compute node operating at the second frequency, wherein, when the workload is the non-clustered workload type, processing of the workload in an entirety is completed by the processor of the compute node.

A non-transitory computer readable storage medium having stored thereon instructions, the instructions being executable by one or more processors to perform operations including receiving, by a calibration module executed by the one or more processors, a calibration request having input parameters including (i) a workload type, (ii) a plurality of compute nodes belonging to a distributed computer system, and (iii) a plurality of frequencies, responsive to verification of the input parameters, setting a first frequency of the plurality of frequencies as an operating frequency of processors of each the plurality of compute nodes, performing calculations from a workload of the workload type on a processor of a compute node of the plurality of compute nodes operating at the first frequency, responsive to performing calculations of the workload of the workload type, sampling one or more measurements of one or more components of the compute node while the calculations from the workload are being performed, responsive to the completion of the performing of the calculations, setting a second frequency of the plurality of frequencies as the operating frequency of the processors of each of the plurality of compute nodes and performing the calculations from the workload on the processor of the compute node operating at the second frequency.

A non-transitory computer readable storage medium having stored thereon instructions, the instructions being executable by one or more processors to perform operations including receiving, by a calibration module executed by the one or more processors, a calibration request having input parameters including (i) a workload type, (ii) a plurality of compute nodes belonging to a distributed computer system, and (iii) a plurality of frequencies, responsive to verification of the input parameters, setting a first frequency of the plurality of frequencies as an operating frequency of processors of each the plurality of compute nodes, performing calculations from a workload of the workload type on a processor of a compute node of the plurality of compute nodes operating at the first frequency, responsive to performing calculations of the workload of the workload type, sampling one or more measurements of one or more components of each compute node processing the workload to collect one or more measurements, responsive to the completion of the performing of the calculations, setting a second frequency of the plurality of frequencies as the operating frequency of the processors of each of the plurality of compute nodes and performing the calculations from the workload on the processor of the compute node operating at the second frequency, wherein the sampling the one or more measurements includes continuously measuring of the compute node, at a predetermined time interval, one or more of a power being currently consumed by a component of the compute node, a voltage applied to a component of the compute node, a current applied to a component of the compute node, a temperature of a component of the compute node, a configuration setting of the compute node, a latency of the compute node, or a bandwidth usage of the compute node.

A non-transitory computer readable storage medium having stored thereon instructions, the instructions being executable by one or more processors to perform operations including receiving, by a calibration module executed by the one or more processors, a calibration request having input parameters including (i) a workload type, (ii) a plurality of compute nodes belonging to a distributed computer system, and (iii) a plurality of frequencies, responsive to verification of the input parameters, setting a first frequency of the plurality of frequencies as an operating frequency of processors of each the plurality of compute nodes, performing calculations from a workload of the workload type on a processor of a compute node of the plurality of compute nodes operating at the first frequency, responsive to performing calculations of the workload of the workload type, sampling one or more measurements of one or more components of each compute node processing the workload to collect one or more measurements, responsive to the completion of the performing of the calculations, setting a second frequency of the plurality of frequencies as the operating frequency of the processors of each of the plurality of compute nodes, performing the calculations from the workload on the processor of the compute node operating at the second frequency, responsive to sampling the one or more measurements of one or more components of each compute node, generating calibration results from the sampled one or more measurements and responsive to generating the calibration results, storing the calibration results in a calibration database.

A non-transitory computer readable storage medium having stored thereon instructions, the instructions being executable by one or more processors to perform operations including receiving, by a calibration module executed by the one or more processors, a calibration request having input parameters including (i) a workload type, (ii) a plurality of compute nodes belonging to a distributed computer system, and (iii) a plurality of frequencies, responsive to verification of the input parameters, setting a first frequency of the plurality of frequencies as an operating frequency of processors of each the plurality of compute nodes, performing calculations from a workload of the workload type on a processor of a compute node of the plurality of compute nodes operating at the first frequency, responsive to performing calculations of the workload of the workload type, sampling one or more measurements of one or more components of each compute node processing the workload to collect one or more measurements, responsive to the completion of the performing of the calculations, setting a second frequency of the plurality of frequencies as the operating frequency of the processors of each of the plurality of compute nodes, performing the calculations from the workload on the processor of the compute node operating at the second frequency, wherein the sampling includes: collecting the one or more measurements of the one or more components of the compute node by the compute node, and processing the one or more measurements by the compute node.

A non-transitory computer readable storage medium having stored thereon instructions, the instructions being executable by one or more processors to perform operations including receiving, by a calibration module executed by the one or more processors, a calibration request having input parameters including (i) a workload type, (ii) a plurality of compute nodes belonging to a distributed computer system, and (iii) a plurality of frequencies, responsive to verification of the input parameters, setting a first frequency of the plurality of frequencies as an operating frequency of processors of each the plurality of compute nodes, performing calculations from a workload of the workload type on a processor of a compute node of the plurality of compute nodes operating at the first frequency, responsive to performing calculations of the workload of the workload type, sampling one or more measurements of one or more components of each compute node processing the workload to collect one or more measurements, responsive to the completion of the performing of the calculations, setting a second frequency of the plurality of frequencies as the operating frequency of the processors of each of the plurality of compute nodes, performing the calculations from the workload on the processor of the compute node operating at the second frequency, wherein the sampling includes: collecting the one or more measurements of the one or more components of the compute node by the compute node, transmitting, after the performance of the calculations has been completed, the collected one or more measurements to a head node of the distributed computer system, and processing the one or more measurements by the head node.

A non-transitory computer readable storage medium having stored thereon instructions, the instructions being executable by one or more processors to perform operations including receiving, by a calibration module executed by the one or more processors, a calibration request having input parameters including (i) a workload type, (ii) a plurality of compute nodes belonging to a distributed computer system, and (iii) a plurality of frequencies, responsive to verification of the input parameters, setting a first frequency of the plurality of frequencies as an operating frequency of processors of each the plurality of compute nodes, performing calculations from a workload of the workload type on a processor of a compute node of the plurality of compute nodes operating at the first frequency, responsive to performing calculations of the workload of the workload type, sampling one or more measurements of one or more components of each compute node processing the workload to collect one or more measurements, responsive to the completion of the performing of the calculations, setting a second frequency of the plurality of frequencies as the operating frequency of the processors of each of the plurality of compute nodes, performing the calculations from the workload on the processor of the compute node operating at the second frequency, wherein the sampling includes: collecting the one or more measurements of the one or more components of the compute node by the compute node, transmitting, at a predetermined time interval during the collecting, the collected one or more measurements to a head node of the distributed computer system, and processing, during the collecting, the one or more measurements by the head node.

A non-transitory computer readable storage medium having stored thereon instructions, the instructions being executable by one or more processors to perform operations including receiving, by a calibration module executed by the one or more processors, a calibration request having input parameters including (i) a workload type, (ii) a plurality of compute nodes belonging to a distributed computer system, and (iii) a plurality of frequencies, responsive to receiving the input parameters, setting a first frequency of the plurality of frequencies as an operating frequency of processors of each the plurality of compute nodes, performing calculations from a workload of the workload type on a processor of a compute node of the plurality of compute nodes operating at the first frequency, responsive to performing calculations of the workload of the workload type, sampling one or more measurements of one or more components of each compute node processing the workload to collect one or more measurements, and responsive to the completion of performing the calculations, setting a second frequency of the plurality of frequencies as the operating frequency of the processors of each of the plurality of compute nodes, performing the calculations from the workload on the processor of the compute node operating at the second frequency, wherein the sampling includes: collecting the one or more measurements of the one or more components of the compute node by the compute node, transmitting, at a predetermined time interval during the collecting, the collected one or more measurements to a head node of the distributed computer system, and processing, during the collecting, the one or more measurements by the head node, and a subset of the sampling is disregarded while processing of the one or more measurements.

A system for calibrating a distributed computer system comprising one or more processors and a storage module communicatively coupled to the one or more processors, the storage module comprises a calibration module to receive a calibration request including (i) a workload type, (ii) a list of compute nodes belonging to a distributed computer system, and (iii) one or more frequencies, responsive to identifying the workload type as a clustered workload type, instruct a plurality of compute nodes on the list of compute nodes to begin processing a workload of the workload type and responsive to identifying the workload type as a clustered workload type, instruct a compute node on the list of compute nodes to begin processing the workload of the workload type.

A system for calibrating a distributed computer system comprising one or more processors and a storage module communicatively coupled to the one or more processors, the storage module comprises a calibration module to receive a calibration request including (i) a workload type, (ii) a list of compute nodes belonging to a distributed computer system, and (iii) one or more frequencies, responsive to identifying the workload type as a clustered workload type, instruct a plurality of compute nodes on the list of compute nodes to begin processing a workload of the workload type and responsive to identifying the workload type as a clustered workload type, instruct a compute node on the list of compute nodes to begin processing the workload of the workload type, wherein, when the workload is the clustered workload type, the processing of the workload is completed through one or more calculations of the workload being computed on each of the plurality of compute nodes, wherein results of the one or more calculations are communicated to a head node.

A system for calibrating a distributed computer system comprising one or more processors and a storage module communicatively coupled to the one or more processors, the storage module comprises a calibration module to receive a calibration request including (i) a workload type, (ii) a list of compute nodes belonging to a distributed computer system, and (iii) one or more frequencies, responsive to identifying the workload type as a clustered workload type, instruct a plurality of compute nodes on the list of compute nodes to begin processing a workload of the workload type and responsive to identifying the workload type as a clustered workload type, instruct a compute node on the list of compute nodes to begin processing the workload of the workload type, wherein, when the workload is the non-clustered workload type, the processing of the workload in an entirety is completed on the compute node.

A system for calibrating a distributed computer system comprising one or more processors and a storage module communicatively coupled to the one or more processors, the storage module comprises a calibration module to receive a calibration request including (i) a workload type, (ii) a list of compute nodes belonging to a distributed computer system, and (iii) one or more frequencies, responsive to identifying the workload type as a clustered workload type, instruct a plurality of compute nodes on the list of compute nodes to begin processing a workload of the workload type, responsive to identifying the workload type as a clustered workload type, instruct a compute node on the list of compute nodes to begin processing the workload of the workload type, and responsive to beginning processing of the workload of the workload type, sample one or more measurements of one or more components of each compute node processing the workload to collect one or more measurements.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A non-transitory computer readable storage medium having stored thereon instructions, the instructions being executable by one or more processors to perform operations including:
    receiving, by a calibration module executed by the one or more processors, a calibration request including (i) a workload type, (ii) a list of compute nodes belonging to a distributed computer system, and (iii) frequencies at which the compute nodes are to operate;
    responsive to identifying the workload type as a clustered workload type, instructing a plurality of compute nodes on the list of compute nodes to begin processing a workload of the workload type;
    responsive to identifying the workload type as a clustered workload type, instructing each compute node on the list of compute nodes to process the workload of the workload type at each of the frequencies in the calibration request and sample a plurality of measurements at predetermined time intervals for each of the frequencies processing the workload at each compute node;
    responsive to beginning processing of the workload of the workload type, sampling one or more measurements of one or more components of each compute node processing the workload to collect measurements at each of the frequencies in the calibration request,
    wherein the sampling includes:
    collecting the measurements of the one or more components of a first compute node on the list of compute nodes by the first compute node,
    transmitting, at a predetermined time interval during the collecting, the collected measurements to a head node of the distributed computer system, and
    processing, during the collecting, the measurements by the head node; and
    generating calibration results based on the sampled measurements at each of the frequencies for each compute node and adjusting a power allocated for a job based on the calibration results.

2. The non-transitory computer readable storage medium of claim 1, wherein, when the workload is the clustered workload type, the processing of the workload is completed through one or more calculations of the workload being computed on each of the plurality of compute nodes, wherein results of the one or more calculations are communicated to a head node.

3. The non-transitory computer readable storage medium of claim 1, wherein, when the workload is a non-clustered workload type, the processing of the workload for the non-clustered workload type is completed on a compute node in an entirety.

4. The non-transitory computer readable storage medium of claim 1, wherein the sampling the measurements includes continuously measuring of a compute node on the list of compute nodes, at a predetermined time interval, one or more of a power being currently consumed by a component of the compute node, a voltage applied to a component of the compute node, a current applied to a component of the compute node, a temperature of a component of the compute node, a configuration setting of the compute node, a latency of the compute node, or a bandwidth usage of the compute node.

5. The non-transitory computer readable storage medium of claim 1, further comprising: responsive to sampling measurements of the one or more components of each compute node, generating calibration results from the sampled measurements; and responsive to generating the calibration results, storing the calibration results in a calibration database.

6. The non-transitory computer readable storage medium of claim 1, wherein the sampling includes: collecting the measurements of the one or more components of a first compute node on the list of compute nodes by the first compute node, and processing the measurements by the first compute node.

7. The non-transitory computer readable storage medium of claim 1, wherein the sampling includes: collecting the measurements of the one or more components of a first compute node on the list of compute nodes by the first compute node, transmitting the collected measurements to a head node of the distributed computer system, and processing the measurements by the head node.

8. The non-transitory computer readable storage medium of claim 1, further comprising: responsive to sampling the measurements of the one or more components of each compute node, generating calibration results from the processed measurements; and responsive to generating the calibration results, adjusting a power allocated for a job based on the calibration results, wherein the workload is the job and the job is requested by a user.

9. A non-transitory computer readable storage medium having stored thereon instructions, the instructions being executable by one or more processors to perform operations including:
    receiving, by a calibration module executed by the one or more processors, a calibration request having input parameters including (i) a workload type, (ii) a plurality of compute nodes belonging to a distributed computer system, and (iii) a plurality of frequencies at which the plurality of compute nodes are to operate;
    responsive to receiving the input parameters, setting a first frequency of the plurality of frequencies as an operating frequency of processors of each the plurality of compute nodes;
    performing calculations from a workload of the workload type on a processor of a compute node of the plurality of compute nodes operating at the first frequency to process the workload;
    responsive to beginning processing of the workload of the workload type, sampling a plurality of measurements of one or more components of the compute node while the calculations from the workload are being performed, wherein the sampling includes:
collecting the measurements of the one or more components of the compute node by the compute node,
transmitting, at predetermined time intervals during the collecting, the collected one or more measurements to a head node of the distributed computer system, and
processing, during the collecting, the measurements by the head node;
responsive to the completion of performing the calculations, setting a second frequency of the plurality of frequencies as the operating frequency of the processors of each of the plurality of compute nodes to process the workload;
performing the calculations from the workload on the processor of the compute node operating at the second frequency; and
generating calibration results based on the calculations and adjusting a power allocated for a job based on the calibration results, wherein the calculations include sampling a plurality of measurements at predetermined time intervals at the first frequency and second frequency processing the workload.

10. The non-transitory computer readable storage medium of claim 9, wherein, when the workload is the clustered workload type, processing of the workload is completed through performance of the calculations using the processors of each of the plurality of compute nodes, and results of the processing are communicated to a head node of the distributed computer system.

11. The non-transitory computer readable storage medium of claim 9, wherein, when the workload is a non-clustered workload type, processing of the workload in an entirety is completed by the processor of the compute node.

12. The non-transitory computer readable storage medium of claim 9, wherein the sampling the measurements includes continuously measuring of the compute node, at a predetermined time intervals, one or more of a power being currently consumed by a component of the compute node, a voltage applied to a component of the compute node, a current applied to a component of the compute node, a temperature of a component of the compute node, a configuration setting of the compute node, a latency of the compute node, or a bandwidth usage of the compute node.

13. The non-transitory computer readable storage medium of claim 9, further comprising: responsive to sampling the measurements of the one or more components of each compute node, generating calibration results from the sampled one or more measurements; and responsive to generating the calibration results, storing the calibration results in a calibration database.

14. The non-transitory computer readable storage medium of claim 9, wherein the sampling includes: collecting the measurements of the one or more components of the compute node by the compute node, and processing the measurements by the compute node.

15. The non-transitory computer readable storage medium of claim 9, wherein the sampling includes: collecting the measurements of the one or more components of the compute node by the compute node, transmitting, after the performance of the calculations has been completed, the collected one or more measurements to a head node of the distributed computer system, and processing the measurements by the head node.

16. The non-transitory computer readable storage medium of claim 9, wherein a subset of the sampling is disregarded while processing of the measurements.

17. A system for calibrating a distributed computer comprising:
a storage module; and
one or more processors communicatively coupled to the storage module, the one or more processors configured to:
receive a calibration request including (i) a workload type, (ii) a list of compute nodes belonging to a distributed computer system, and (iii) frequencies at which the compute nodes are to operate;
responsive to identifying the workload type as a clustered workload type, instruct a plurality of compute nodes on the list of compute nodes to begin processing a workload of the workload type; and
responsive to identifying the workload type as a clustered workload type, instruct a compute node on the list of compute nodes to process the workload of the workload type at each of the frequencies in the calibration request and sampling a measurements at predetermined intervals for each of the frequencies processing the workload at the compute node;
responsive to beginning processing of the workload of the workload type, sampling one or more measurements of one or more components of each compute node processing the workload to collect measurements at each of the frequencies in the calibration request,
wherein the sampling includes:
collecting the measurements of the one or more components of a compute node on the list of compute nodes by the compute node,
transmitting, at a predetermined time interval during the collecting, the collected measurements to a head node of the distributed computer system, and
processing, during the collecting, the measurements by the head node; and
generating calibration results based on the sampled measurement and adjusting a power allocated for a job based on the calibration results.

18. The system of 21, wherein, when the workload is the clustered workload type, the processing of the workload is completed through one or more calculations of the workload being computed on each of the plurality of compute nodes, wherein results of the one or more calculations are communicated to the head node.

19. The system of claim 17, wherein, when the workload is a non-clustered workload type, the processing of the workload in an entirety is completed on the compute node.

20. The system of claim 17, wherein the one or more processors are further configured to responsive to beginning processing of the workload of the workload type, sample measurements of one or more components of each compute node processing the workload to collect measurements.

* * * * *